United States Patent
Yasuraoka et al.

(10) Patent No.: US 9,697,812 B2
(45) Date of Patent: Jul. 4, 2017

(54) STORAGE MEDIUM AND TONE GENERATION STATE DISPLAYING APPARATUS

(71) Applicant: Yamaha Corporation, Hamamatsu-Shi, Shizuoka-Ken (JP)

(72) Inventors: Naoki Yasuraoka, Hamamatsu (JP); Shigehiko Mizuno, Hamamatsu (JP); Tomoko Okumura, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 14/512,303

(22) Filed: Oct. 10, 2014

(65) Prior Publication Data
US 2015/0101474 A1    Apr. 16, 2015

(30) Foreign Application Priority Data
Oct. 12, 2013  (JP) .................. 2013-214279

(51) Int. Cl.
*G10H 1/00*    (2006.01)
*G10H 1/18*    (2006.01)
(Continued)

(52) U.S. Cl.
CPC ........... *G10H 1/0008* (2013.01); *G09B 15/02* (2013.01); *G10G 1/00* (2013.01); *G10G 1/02* (2013.01);
(Continued)

(58) Field of Classification Search
CPC ........ G09B 15/02; G10H 1/0008; G10H 1/18; G10H 1/38
(Continued)

(56) References Cited

U.S. PATENT DOCUMENTS 5,099,738 A * 3/1992 Hotz ............... G10H 1/0075
                                                   84/617
5,523,521 A * 6/1996 Suzuki ............... G10H 1/186
                                                   84/615
(Continued)

FOREIGN PATENT DOCUMENTS

EP    2 866 222 A1   4/2015
FR    2 440 051 A1   5/1980
(Continued)

OTHER PUBLICATIONS

Extended European Search Report mailed Mar. 30, 2015, for EP Application No. 14188447.8, nine pages.
(Continued)

*Primary Examiner* — David Warren
*Assistant Examiner* — Christina Scheriber
(74) *Attorney, Agent, or Firm* — Morrison & Foerster LLP

(57) ABSTRACT

When a processor accepts an input of plural notes to be assigned for tone generation, according to a predetermined note determining rule called "assignment type", the processor selects one or more notes to be sounded in each of plural parts from the accepted notes. The processor controls a display unit to display, for each of the plural parts, the accepted plural notes to be assigned for tone generation. At this time, non-selected one or more notes in respective parts are displayed in one style, and the selected one or more notes in the respective parts are displayed in another style different from the one style. Alternatively, the plural notes to be assigned for tone generation are displayed in one style, and, for each of the plural parts, the selected one or more notes are displayed in another style different from the one style.

20 Claims, 10 Drawing Sheets

(51) Int. Cl.
  *G10H 1/22* (2006.01)
  *G10H 1/38* (2006.01)
  *G09B 15/02* (2006.01)
  *G10G 1/00* (2006.01)
  *G10G 1/02* (2006.01)
  *A63H 5/00* (2006.01)

(52) U.S. Cl.
  CPC .............. *G10H 1/18* (2013.01); *G10H 1/22* (2013.01); *G10H 1/38* (2013.01); *G10H 2210/00* (2013.01); *G10H 2210/571* (2013.01); *G10H 2220/005* (2013.01); *G10H 2220/015* (2013.01); *G10H 2220/036* (2013.01); *G10H 2220/041* (2013.01); *G10H 2220/091* (2013.01); *G10H 2220/241* (2013.01)

(58) Field of Classification Search
  USPC ........................................ 84/609, 613, 615
  See application file for complete search history.

(56) References Cited

U.S. PATENT DOCUMENTS

| | | | | |
|---|---|---|---|---|
| 5,524,522 | A * | 6/1996 | Hesnan | G09B 15/003 84/471 SR |
| 6,084,171 | A * | 7/2000 | Kay | G10H 1/38 84/613 |
| 6,791,568 | B2 * | 9/2004 | Steinberg | G10H 1/0008 345/600 |
| 7,109,407 | B2 * | 9/2006 | Hasegawa | G09B 15/04 84/613 |
| 7,212,213 | B2 * | 5/2007 | Steinberg | G10H 1/0008 345/440 |
| 7,453,035 | B1 * | 11/2008 | Evans | G09B 15/023 84/477 R |
| 7,608,775 | B1 * | 10/2009 | Evans | G10H 1/0008 84/611 |
| 7,767,895 | B2 * | 8/2010 | Johnston | G09B 15/02 84/470 R |
| 7,772,480 | B2 * | 8/2010 | Brennan | G09B 5/06 434/307 A |
| 7,842,877 | B2 * | 11/2010 | Charles | G10D 13/08 84/470 R |
| 7,982,118 | B1 * | 7/2011 | Gleaves | G10H 1/0025 84/609 |
| 8,017,856 | B2 | 9/2011 | Tanaka | |
| 8,378,194 | B2 * | 2/2013 | Daisy | G09B 5/06 84/470 R |
| 8,957,296 | B2 * | 2/2015 | Helms | G10H 1/0016 84/470 R |
| 9,035,162 | B2 * | 5/2015 | Hamilton | G10H 1/0016 84/613 |
| 9,129,583 | B2 * | 9/2015 | Little | G10H 1/0016 |
| 2006/0032360 | A1 * | 2/2006 | Mizuno | G09F 9/372 84/483.2 |
| 2007/0221047 | A1 * | 9/2007 | Kim | G10H 1/0008 84/615 |
| 2010/0077908 | A1 * | 4/2010 | Tanaka | G10H 7/008 84/605 |
| 2010/0162875 | A1 * | 7/2010 | Charles | G10D 13/08 84/477 R |
| 2011/0023688 | A1 * | 2/2011 | Daisy | G09B 5/06 84/483.1 |
| 2011/0232463 | A1 * | 9/2011 | Sattlecker | G10G 1/02 84/613 |
| 2013/0133506 | A1 * | 5/2013 | Daisy | G09B 5/06 84/455 |
| 2014/0047971 | A1 * | 2/2014 | Akazawa | G10H 1/18 84/609 |
| 2015/0013529 | A1 * | 1/2015 | Twillman | G10H 1/18 84/615 |
| 2015/0101474 | A1 * | 4/2015 | Yasuraoka | G10H 1/0008 84/609 |
| 2015/0101476 | A1 * | 4/2015 | Murata | G10H 1/0025 84/615 |
| 2015/0107443 | A1 * | 4/2015 | Yasuraoka | G10H 1/18 84/615 |
| 2015/0170624 | A1 * | 6/2015 | Yamauchi | G10H 1/10 84/600 |

FOREIGN PATENT DOCUMENTS

| | | |
|---|---|---|
| JP | 2565069 B2 | 12/1996 |
| JP | 2000-163059 A | 6/2000 |
| JP | 2002-341871 A | 11/2002 |
| JP | 2010-79179 A | 4/2010 |
| WO | WO-90/07771 | 7/1990 |
| WO | WO-02/41295 A1 | 5/2002 |
| WO | WO-2008/094415 A2 | 8/2008 |
| WO | WO-2014/195584 A1 | 12/2014 |

OTHER PUBLICATIONS

Yamaha Corporation. (Jan. 2, 2012). "Digital Keyboard PSR-E343 YPT-340," Owner s Manual, C.S.G., DMI Development Division, located at: <URL:http://usa.yamaha.com/products/musical-instruments/keyboards/digitalkeyboards/portable_keyboards/psr-e343/>, retrieved on Mar. 5, 2015, pp. 1-64.

European Office Action mailed Mar. 3, 2016, for EP Application No. 14188447.8, six pages.

Anders, T. et al. (Oct. 18, 2011). "Constraint Programming Systems for Modeling Music Theories and Composition," ACM Computing Surveys, ACM, New York, NY, US, vol. 43, No. 4, Article 30, pp. 1-38, XP058004949, ISSN: 0360-0300, DOI: 10.1145/1978802. 1978809.

European Communication dated Apr. 14, 2016, for EP Patent Application No. 14188459.3, eight pages.

European Search Report dated Jun. 3, 2015, for EP Patent Application No. 14188459.3, eight pages.

Non-Final Office Action mailed Dec. 24, 2015, for U.S. Appl. No. 14/512,271, filed Oct. 10, 2014, nine pages.

Roland. (Jan. 1, 1988). "MIDI Intelligent Synthesizer E-20," Owner's Manual, Osaka, Japan, Retrieved from Internet: <URL:http://media.rolandus.com/manuals/E-20OM.pdf> on May 26, 2014, 82 pages.

* cited by examiner

Fig. 5A
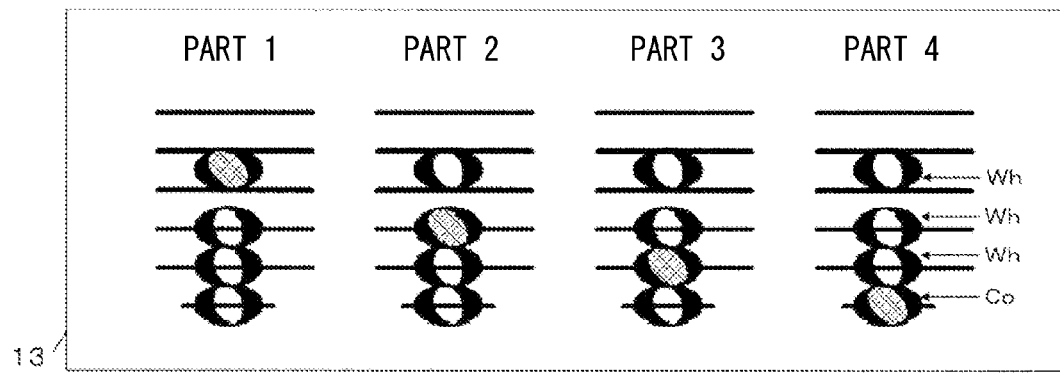
Fig. 5B
Fig. 5C
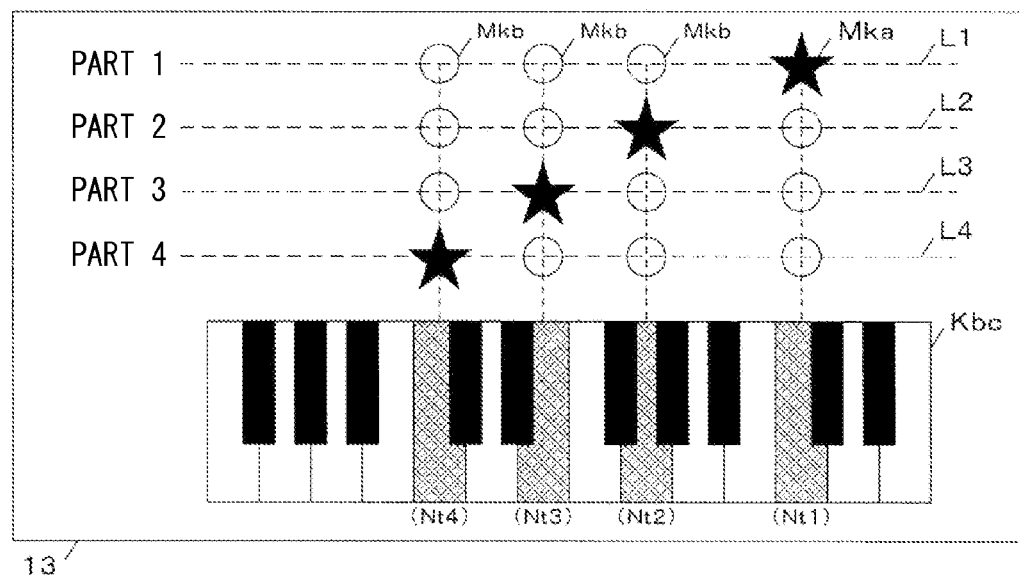

Fig. 6A

FIRST ASSINMENT TYPE

|  | TARGET NOTE | PRIORITY METHOD | NUMBER TO BE SOUNDED |
|---|---|---|---|
| FIRST PART | ALL | HIGHER-PITCH-PRIOR-TO-LOWER-PITCH | 1 |
| SECOND PART | EXCLUDE HIGHEST PITCH | HIGHER-PITCH-PRIOR-TO-LOWER-PITCH | 1 |
| THIRD PART | UP TO TWO NOTES FROM LOWER PITCH SIDE | HIGHER-PITCH-PRIOR-TO-LOWER-PITCH | 1 |
| FOURTH PART | ALL | LOWER-PITCH-PRIOR-TO-HIGHER-PITCH | 1 |

Fig. 6B

SECOND ASSINMENT TYPE

|  | FIRST TARGET NOTE | SECOND TARGET NOTE | NUMBER TO BE SOUNDED | NUMBER TO BE SOUNDED |
|---|---|---|---|---|
| FIRST PART | ALL | - | HIGHER-PITCH-PRIOR-TO-LOWER-PITCH | 1 |
| SECOND PART | EXCLUDE HIGHEST PITCH | UP TO TWO NOTES FROM HIGHER PITCH SIDE | LAST-NOTE-PRIOR-TO-FIRST-NOTE | 1 |
| THIRD PART | EXCLUDE LOWEST PITCH | UP TO TWO NOTES FROM LOWER PITCH SIDE | LAST-NOTE-PRIOR-TO-FIRST-NOTE | 1 |
| FOURTH PART | ALL | - | LOWER-PITCH-PRIOR-TO-HIGHER-PITCH | 1 |

Fig. 6C

THIRD ASSINMENT TYPE

|  | NUMBER OF NOTES | | | |
|---|---|---|---|---|
|  | 1 | 2 | 3 | 4 |
| FIRST PART | KEY DEPRESSION NOTE | HIGHEST NOTE | HIGHEST NOTE | HIGHEST NOTE |
| SECOND PART | KEY DEPRESSION NOTE | HIGHEST NOTE | SECOND HIGHEST NOTE | SECOND HIGHEST NOTE |
| THIRD PART | KEY DEPRESSION NOTE | LOWEST NOTE | LOWEST NOTE | SECOND LOWEST NOTE |
| FOURTH PART | KEY DEPRESSION NOTE | LOWEST NOTE | LOWEST NOTE | LOWEST NOTE |

STORAGE MEDIUM AND TONE GENERATION STATE DISPLAYING APPARATUS

TECHNICAL FIELD

The invention relates to a storage medium storing a program enabling, when plural parts are assigned to plural notes to be sounded in timbres of the respective parts, to display tone generation states of respective parts on a screen in an easily understandable manner, and to a tone generation state displaying apparatus performing such display.

BACKGROUND ART

It has been conventionally performed to sound plural parts or timbres simultaneously when a user plays a keyboard in an electronic musical instrument. In particular, as a technique (hereinafter referred to as an "ensemble tone generating function") to distribute notes having plural different tone pitches, which are inputted by simultaneous depressing of plural keys or the like, among plural parts or timbres to sound the notes in the plural parts, there is known an electronic musical instrument which assigns either plural parts or timbres to plural notes inputted by using a keyboard or the like to sound the notes in the respective parts or timbres. For example, in the electronic musical instrument of PTL1, in a unison-two mode, predetermined plural parts (four parts for example), which constitute a composition of musical instruments and to each of which plural different timbres are set, are assigned substantially evenly according to the tone pitch order to respective notes of keys being depressed, thereby allowing that even when the number of notes of keys being depressed changes, the total number of parts to be sounded does not change, and the respective parts are utilized evenly.

Further, in the electronic musical instrument of PTL2, there are provided plural assigners, which assign (correlate) notes of depressed keys to tone generation channels. Each assigner has settings of an assignment priority rule (for example, assignment method: higher-pitch-prior-to-lower-pitch, last-note-prior-to-first-note, lower-note-prior-to-higher-note), a number of notes to be sounded, and timbres (piano A, violin B, or the like). The electronic musical instrument uses plural assigners each of which has suitable settings (for example, an assignment priority rule to be applied, the maximum number of notes of depressed keys able to sound, and timbres to be used in the tone (sound) generation) to enable functions such as dual, split, and so on.

However, in the electronic musical instrument of PTL1 or PTL2, when plural keys are depressed (note-on input) simultaneously, if musical tones at different notes are sounded in respective parts or respective timbres, it is difficult to grasp what note of musical tones are sounded in what part or what timbre. Further, when the inputted notes themselves are not inputted by a user operation (key depression) but externally inputted or automatically generated, it is further difficult to grasp the tone generating status regarding what kind of tone generation is performed in respective parts or timbres with respect to what kind of input. Moreover, when it is difficult for a user to recognize tone generating status, hurdles for such users to set a tone generation assignment method and so on increase.

On the other hand, there has been known technologies related to display of a key depression state or the like. For example, NPL1 and NPL2 describe that, on a staff notation or keyboard displayed on a screen, positions of depressed keys are displayed as positions in the staff notation or the keyboard, a melody chord of a song (song data in MIDI format) is displayed, and notes constituting a chord are displayed (sections of "musical note display" and "keyboard display"). However, NPL1 does not disclose display of a tone generation state when plural parts or timbres are assigned to inputted plural notes to sound them.

CITATION LIST

Patent Literature

{PTL1} JP 2010-79179 A
{PTL2} JP 2565069 B2

Non Patent Literature

{NPL1} PSR-E344 Owner's Manual (2012, Yamaha Corporation), p. 13, [online], the Internet <http://www2.yamaha.co.jp/manual/pdf/emi/japan/portipsre344_ja_om_a0.pdf>
{NPL2} PSR-E343 YPT-340 Owner's Manual (2012, Yamaha Corporation), p. 13, [online], the Internet <http://www2.yamaha.co.jp/manual/pdf/emi/english/port/psre343_en_om_b0. pdf>

SUMMARY OF INVENTION

Technical Problem

In view of such situations, it is an object of this invention to enable a user to confirm tone generation states of respective parts easily when plural input notes are distributed among plural parts to be sounded.

Solution to Problem

To attain the above object, a storage medium of the invention is a non-transitory machine-readable storage medium containing program instructions executable by a computer and enabling the computer to perform a method including: accepting inputs of plural notes to be assigned for tone generation; selecting one or more notes to be sounded in each of plural parts according to a predetermined note determining rule from the plural notes to be assigned for tone generation accepted in the accepting.

The method further includes displaying, for each of the plural parts, the plural notes to be assigned for tone generation, one or more notes in respective parts not selected in the selecting being displayed in one style in the displaying, and one or more notes in the respective parts selected in the selecting being displayed in another style different from the one style in the displaying.

Alternatively, the method further includes displaying in one style the plural notes to be assigned for tone generation and displaying, for each of the plural parts, the one or more notes to be sounded in respective parts selected in the selecting in another style different from the one style.

In the above storage mediums, it is conceivable that the plural notes to be assigned for tone generation accepted in the accepting are specified by a performance operation of a user.

Further, it is also conceivable that the method further includes generating plural notes automatically based on a note specified by a performance operation of a user, and the plural notes generated in the generating are accepted as the notes to be assigned for tone generation in the accepting.

Furthermore, it is also conceivable that the method further includes obtaining chord information, and the plural notes are generated automatically in the generating based on the note specified by the performance operation of the user and the chord information obtained in the obtaining.

It is also conceivable that the note determining rule defines a rule for selecting, in each part, one or more notes from the plural notes to be assigned for tone generation based on tone pitch order or note-on timing order of the plural notes.

Alternatively, it is also conceivable that the note determining rule defines a rule for selecting, in each part, one or more notes from the plural notes to be assigned for tone generation based on number and tone pitch order of the plural notes.

It is also conceivable that the method further includes: controlling a sound generator to generate sound of the one or more notes selected in the selecting in a timbre set in advance, with respect to each of the parts.

It is also conceivable that the plural notes to be assigned for tone generation are displayed in the displaying as positions of keys in images of keyboards corresponding respectively to the plural parts, and in the image of each keyboard, keys of the one or more notes not selected in the selecting in one part corresponding to the image of the keyboard are displayed in the one style, and keys of the one or more notes selected in the selecting in the one part are displayed in the another style.

Alternatively, it is also conceivable that the plural notes to be assigned for tone generation are displayed in the displaying as positions of musical notes in images of staff notations corresponding respectively to the plural parts, and in the image of each staff notation, musical notes at pitches of the one or more notes not selected in the selecting in one part corresponding to the image of the keyboard are displayed in the one style, and musical notes at pitches of the one or more notes selected in the selecting in the one part are displayed in the another style.

Alternatively, it is also conceivable that the plural notes to be assigned for tone generation are displayed in the displaying as lists of note names corresponding respectively to the plural parts, and in each of the lists, note names of the one or more notes not selected in the selecting in one part corresponding to the list are displayed in the one style, and note names of the one or more notes selected in the selecting in the one part are displayed in the another style.

Alternatively, it is also conceivable that the plural notes to be assigned for tone generation are displayed in the displaying as positions of keys in an image of one keyboard, and, for each of the plural parts, the one or more notes selected in the selecting in the part are displayed by a mark at a position corresponding to a key of the selected note in the image of the keyboard.

The invention can be realized or embodied also as device, method, system, computer program, or other arbitrary manner other than the above described storage mediums.

Advantageous Effects of Invention

The above configuration enables a user to confirm tone generation states of respective parts easily when plural input notes are distributed among plural parts to be sounded.

BRIEF DESCRIPTION OF DRAWINGS

FIG. 5A illustrates a screen display example according to another embodiment of the invention.

FIG. 5B illustrates a screen display example according to still another embodiment of the invention.

FIG. 5C illustrates a screen display example according to still another embodiment of the invention.

FIG. 6A illustrates an example of assignment types according to an embodiment of the invention.

FIG. 6B illustrates another example of the assignment types.

FIG. 6C illustrates still another example of the assignment types.

DESCRIPTION OF EMBODIMENTS

Overview of Embodiment

Figure 1:
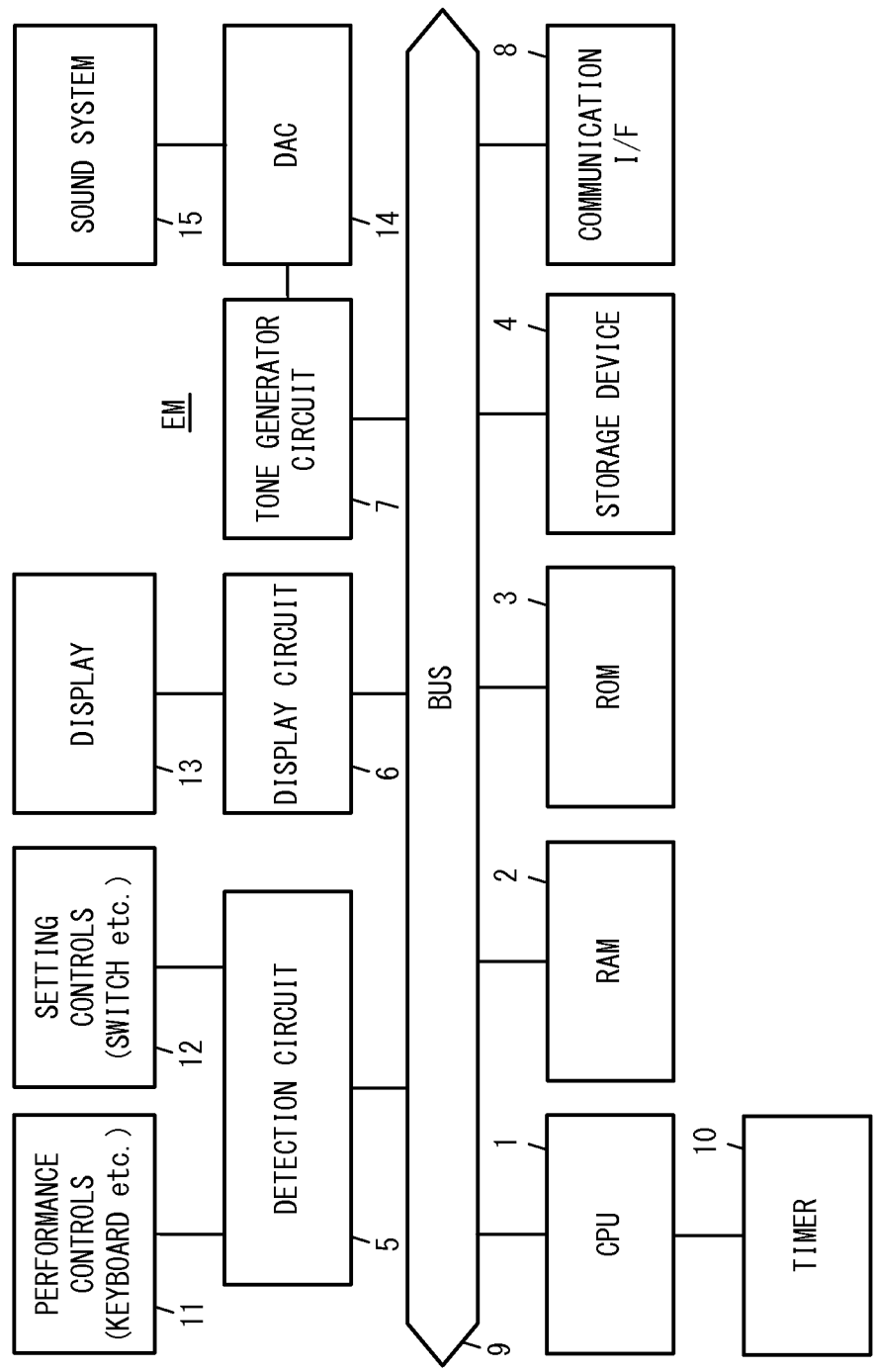
FIG. 1 is a hardware configuration block diagram of an electronic musical instrument according to an embodiment of the invention.

According to a tone generation state display system embodying a first characteristic of the invention, in a tone generation state displaying apparatus (EM) displaying tone generation states in plural parts on a screen (13), when inputs of plural notes [Nk(Nk1, Nk2, . . . ) or Nki+Na(Na1, Na2, . . . )] to be assigned for tone generation are accepted (S31), one or more notes (Nt) to be sounded in each of the parts are selected according to a predetermined note determining rule ("assignment type") and based on pitches of the accepted input notes (Nk or Nki+Na) (S34), and among the accepted input plural notes (Nk or Nki+Na) to be assigned for tone generation, pitches of non-selected note or notes are displayed in a first style (S41) and pitches of the selected note or notes (Nt) are displayed in a second style different from the first style (S44), corresponding to each of the plural parts.

Specifically, in this invention, in the case where an ensemble tone generating function, which assigns plural parts to simultaneously inputted plural notes (Nk or Nki+Na) to be assigned for tone generation and generates sounds (tones) of each of the notes in timbres of parts assigned to the notes, thereby distributing plural notes (Nk or Nki+Na) among plural parts to sound (dispersing plural notes into plural parts), is executed, when tone generation states of the respective parts are displayed on the screen (13), a "note not to be sounded" and a "note to be sounded" (Nt) are displayed in different display styles (display manner) with respect to the accepted input notes (Nk or Nki+Na) in each of the respective parts.

Therefore, according to this invention, when plural input notes are distributed among plural parts to sound, by displaying, in each part, input notes to be actually sounded in the part and input notes not to be sounded in the part in different styles, it can be seen that which note is accepted as an assignment target and which note is sounded in each part, and thus tone generation states of respective parts can be visually confirmed easily as to which note sounds in each of the plural parts distributed among the plural notes.

Note that ones described in parentheses are reference signs in drawings, terms, referenced places, and so on added for convenience of understanding, and the same applies hereinafter.

According to a tone generation state display system embodying a second characteristic of this invention, in a tone generation state displaying apparatus (EM) displaying tone generation states in plural parts on a screen (13), when inputs of plural notes [Nk(Nk1, Nk2, ... ) or Nki+Na(Na1, Na2, ... )] to be assigned for tone generation are accepted (S31), regarding each of the plural parts, one or more notes (Nt) to be sounded in the part are selected according to a predetermined note determining rule ("assignment type") and based on pitches of the accepted input notes (Nk or Nki+Na) (S34), pitches of the accepted input plural notes (Nk or Nki+Na) to be assigned for tone generation are displayed in a first style (S41), and pitches of the selected notes (Nt) are displayed in a second style different from the first style, in correspondence with each of the plural parts (S44).

Specifically, in this invention, in the case where an ensemble tone generating function, which assigns plural parts to simultaneously inputted plural notes (Nk or Nki+Na) for tone generation assignment and generates sounds (tones) of each of the notes in timbres of parts assigned to the notes, thereby distributing plural notes (Nk or Nki+Na) among plural parts to sound, is executed, when tone generation states of the respective parts are displayed on the screen (13), display style of the "accepted input notes (Nk or Nki+Na)" and display style of the "note to be sounded" (Nt) in each of the respective parts are made to be different.

Therefore, according to this invention, when plural input notes are distributed among plural parts to sound, by displaying all the input notes (pitches) and the input notes (pitches) to be actually sounded in each part in different display styles, it can be seen that what note is accepted as an assignment target and what note is actually sounded, and thus tone generation states of respective parts can be visually confirmed easily as to which note sounds in each of the plural parts distributed among plural notes.

Further, a tone generation state display program according to the invention is configured to accept a note [NK(Nk1, Nk2, ... ) or Nki] specified by a performance operation of a user as the notes for tone generation assignment (S31).

Therefore, according to the invention, a tone generation state of a performance sound in each part based on an actual performance of the user such as a key depression can be confirmed.

Further, the tone generation state display program according to the invention is configured so that plural notes are generated automatically (AN; S25) based on notes (Nki) specified by a performance operation of a user, and the generated plural notes [Na(Na1, Na2, ... )] are accepted as notes to be assigned for tone generation (S31).

Therefore, according to the invention, how an additional sound generated automatically according to a performance sound based on a user performance such as a key depression is sounded in each part can be confirmed.

Moreover, the tone generation state display program according to the invention is configured so that chord information is obtained (AN; S23), and plural notes are generated automatically based on the notes (Nki) specified by the performance operation of the user and the obtained chord information (S25).

Therefore, according to the invention, how a performance sound based on a user performance such as depressing a key and an additional harmony sound generated automatically according to this performance sound are sounded in each part can be visually confirmed.

Further, the tone generation state display program according to the invention is configured so that, by predetermined note determining rules (first and second assignment types), one or more notes (Nt) selected based on a pitch order or a note-on timing order are selected in each part as notes to be sounded in the part from the plural notes (Nk or Nki+Na) to be assigned for tone generation (S34).

Therefore, according to the invention, when notes to be sounded in each part are determined based on the priority order regarding the pitch order or the note-on timing order from plural input notes, how the input notes are sounded in each part can be confirmed visually.

Further, the tone generation state display program according to the invention is configured so that by a predetermined note determining rule (third assignment type), notes to be sounded in each part are selected based on a number and a pitch order regarding the plural notes (Nk or Nki+Na) to be assigned for tone generation (S34).

Therefore, according to the invention, when plural input notes are distributed among the respective parts according to the number and the tone pitch order regarding input notes, how the input notes are sounded in each part can be visually confirmed.

Further, the tone generation state displaying apparatus (EM) according to the invention is configured so that musical tones of notes (Nt) selected with respect to each part are sounded (7) in timbres determined as to the corresponding part in advance.

Therefore, according to the invention, a user can confirm pitches of the performance sounds generated in each part visually while listening to the generated performance sounds.

[Hardware Configuration of Tone Generation State Displaying Apparatus]

In a tone generation state display system according to an embodiment of the invention, an electronic musical instrument is used as a tone generation state displaying apparatus, and this electronic musical instrument also function as a tone generation assigning apparatus. FIG. 1 is a hardware configuration block diagram of the tone generation state displaying apparatus according to an embodiment of this invention. This tone generation state displaying apparatus that is the electronic musical instrument EM has, as a hardware configuration, elements such as a central processing unit (CPU) 1, a random access memory (RAM) 2, a read only memory (ROM) 3, a storage device 4, a detection circuit 5, a display circuit 6, a tone generator circuit 7, a communication interface (communication I/F) 8, and so on, and these elements 1 to 8 are connected one another via a bus 9.

The CPU 1 as a processor controlling the entire electronic musical instrument EM constitutes a data processor together with a RAM 2 and a ROM 3, and executes various processing including a tone generation assignment display processing according to various control programs including a tone generation assignment display processing program by utilizing clocks by a timer 10. The RAM 2 is used for temporarily storing or retaining various data needed for these processings, and the ROM 3 stores predetermined control programs and control data.

The storage device 4 includes a storage medium such as an HD (hard disk) and a flash memory and a drive device thereof, and is able to store control programs and various data in an arbitrary storage medium. The storage medium may be included in this device or may be removable like external various storage media (memory card, USB memory, CD-R, and the like). Further, in the storage device 4, various application programs and various data can be stored in advance.

The detection circuit 5 constitutes a performance controller together with performance controls 11 such as a keyboard, detects a performance operation of the performance controls 11, and introduces performance control information corresponding to the detected operation into the data processor (1 to 3). The data processor generates performance information based on this performance control information and transmits the generated performance information to the tone generator circuit 7. During the tone generation assignment display processing, the performance controls (hereinafter described as a keyboard) 11 functions as a tone generation instruction acceptor, the detection circuit 5 functions as a key depression state detector, and the data processor (1 to 3) functions as an additional sound generator (AN) and an assignment controller (AC). The detection circuit 5 also constitutes an input controller together with setting controls 12 such as switches, detects an operation to the setting controls 12, and introduces various information corresponding to the detected operation into the data processor (1 to 3).

The display circuit 6 constitutes a display unit together with the display 13 such as an LCD, controls displayed contents of the display 13 according to instructions from the CPU 1, and performs display assistance with respect to various user operations. For example, when the tone generation assignment display processing is performed, a tone generation state display screen, which displays on a keyboard image or the like a state that plural notes based on key depressions are sounded while distributing the notes among the plural parts, is displayed on the display 13. Further, by instructing a button displayed on the display 13 with a setting control (cursor switches) 12, the button can be used as a control. Note that the function of the setting controls 12 and the display 13 can be integrated using a touch panel. In this case, the display button can be used as a control which can be operated by touching.

The tone generator circuit 7 functions as a tone generator (sound source), includes a tone generator unit and a DSP (digital signal processor). The tone generator circuit 7 generates audio signals representing musical tone waveforms of various musical instrument timbres according to actual performance information based on performance control information from the performance controller (11, 5), automatic performance information stored in the storage device 4, automatic performance information received via the communication I/F 8 from an external automatic performance information source, or performance information generated by an additional sound generating function provided in this electronic musical instrument EM, in the tone generator unit. The tone generator circuit 7 can further add predetermined effects to the generated audio signals and perform mixing (DSP) to the generated audio signals, and output the resultant signals. A digital-analog conversion circuit (DAC) 14 functions as a musical tone output unit (SD) together with a sound system 15 having an amplifier, a speaker, or the like, converts a digital audio signal generated in the tone generator circuit 7 into an analog audio signal and outputs it to the sound system 15, thereby generating a musical tone based on the analog audio signal.

The communication I/F 8 includes a musical I/F such as MIDI, a general-purpose near distance wired I/F such as a USB and an IEEE1394, a general-purpose network I/F such as Ethernet (trademark), a general-purpose near distance wireless I/F such as a wireless LAN or Bluetooth (trademark) LAN, and the like and is used for communicating with an external apparatus via a communication network.

[Overview of Tone Generation Assigning Function]

Figure 2:
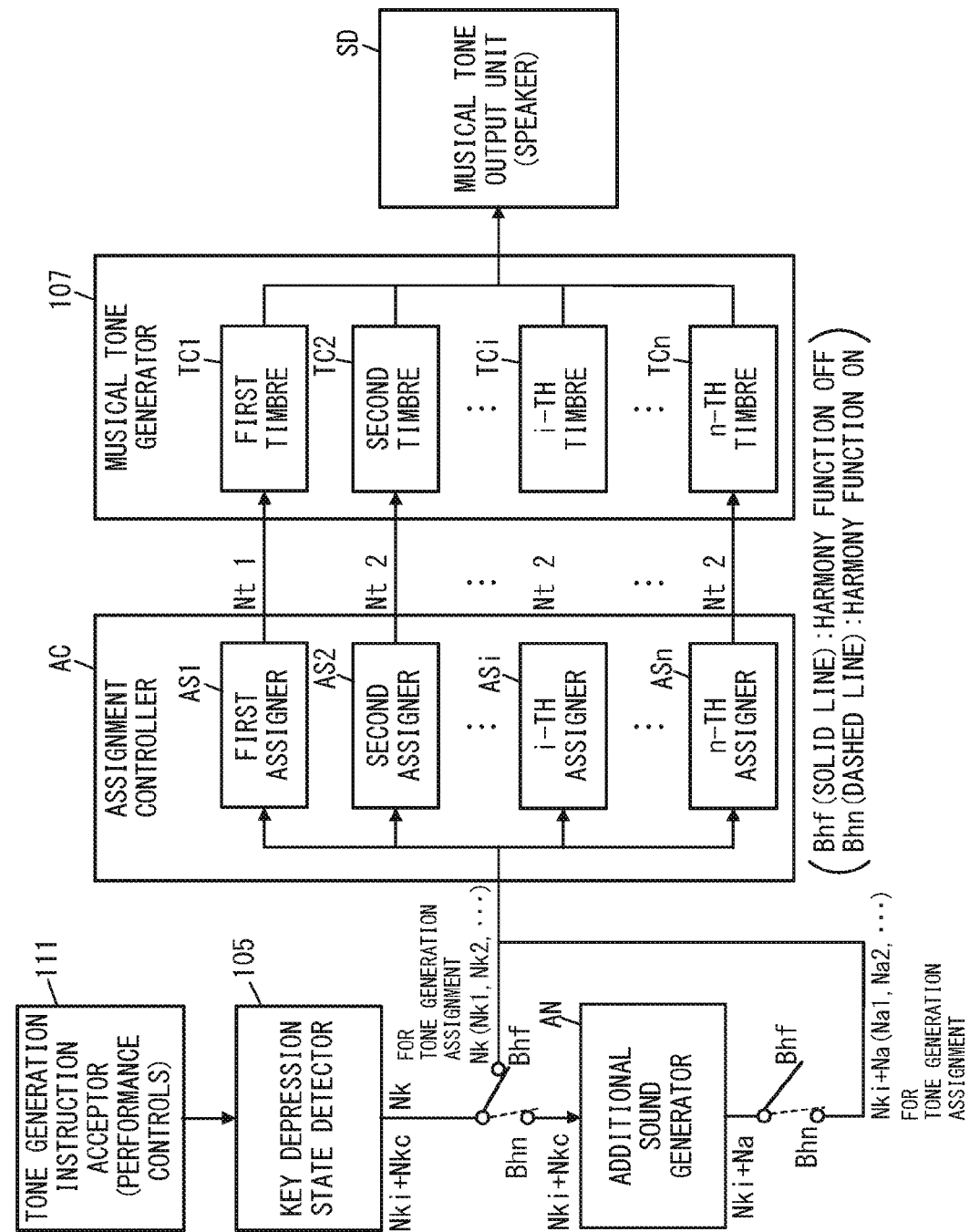
FIG. 2 is a block diagram illustrating an overview of a tone generation assigning function according to an embodiment of the invention.

This electronic musical instrument executes the tone generation assignment display processing according to the tone generation assignment display processing program, and functions as a tone generation assigning apparatus or a tone generation state displaying apparatus. FIG. 2 is a functional block diagram for describing an overview of the tone generation assigning function according to an embodiment of the invention. This electronic musical instrument EM functions as a tone generation assigning apparatus by the tone generation assignment display processing, and as illustrated in the diagram, executes the tone generation assigning function indicated by functional blocks of a tone generation instruction acceptor 111, a key depression state detector 105, an additional sound generator AN, an assignment controller AC, a musical tone generator 107, and a musical tone output unit SD.

The tone generation instruction acceptor 111 corresponds to the function of the performance controls 11 (FIG. 1), and for example, accepts a tone generation instruction by a user operation on performance controls of keyboard type. Specifically, when one or more notes are arbitrarily specified by a performance operation of the user, an instruction to generate a musical tone at this note is accepted by the tone generation instruction acceptor 111. For example, when any key on the keyboard is depressed, a note signal corresponding to the depressed key is supplied to the key depression state detector 105.

The key depression state detector 105 corresponds to the function of the detection circuit 5 (FIG. 1), and generates pitch information (note number) and key-on information (note-on event) of the depressed key based on the note signal supplied from the tone generation instruction acceptor 111, outputs key depression note information Nki+Nkc; Nk including the pitch information and the key-on information to the additional sound generator AN or the assignment controller AC, thereby notifying that (pitch of) the note corresponding to the key depression is specified. Note that when a key which has been depressed is released, information including pitch information (note number) and key-off information (note-off event) of this key is outputted in response to a note signal corresponding to the key release, thereby notifying that the note which has been specified corresponding to this key has disappeared.

Here, when a "harmony function" (which will be described later) is set to off (when virtual two changeover switches illustrated are on a harmony function off (Bhf) side as depicted by solid lines), key depression note information Nk: Nk1, Nk2, . . . (symbol "Nk" representatively denotes note information generated based on a key depressed manually) based on the key depression in the entire key range of the keyboard 11 is outputted as information of notes to be assigned for tone generation to the assignment controller AC. On the other hand, when the harmony function is set to on (when the virtual changeover switches illustrated are on a harmony function on (Bhn) side as depicted by dashed lines), key depression note information Nki of a performance key area based on a key depression in the performance key area (Ki) of the keyboard 11 and key depression note information Nkc (Nkc1, Nkc2, . . . ) of a chord key area based on a key depression in the chord key area (Kc) are outputted to the additional sound generator AN for generating an additional sound (additional musical tones).

The additional sound generator AN corresponds to the additional sound generating function of the data processor (FIGS. 1: 1 to 3) including the CPU 1, operates when the harmony function is set to on, and automatically generates plural pieces of additional note information Na: Na1, Na2, . . . (symbol "Na" representatively denotes note information generated additionally and automatically) indicating predetermined notes based on the key depression note information Nki and Nkc inputted from the key depression state detector 105. Specifically, while the harmony function is on, when the key depression note information Nki of the performance key area based on the key depression in the performance key area (Ki) and the key depression note information Nkc of the chord key area based on the key depression in the chord key area (Kc) are inputted from the key depression state detector 105, the additional sound generator AN determines a chord based on the note (note number) of the key depression note information Nkc of the chord key area, automatically generates plural pieces of additional note information Na1, Na2, . . . having notes of pitches which harmonize the pitch of the note of the key depression note information Nki of the performance key area according to the determined chord, and outputs the key depression note information Nki of the performance key area and the plural pieces of additional note information Na1, Na2, . . . to the assignment controller AC as the information of notes to be assigned for tone generation.

The assignment controller AC corresponds to an assignment control function of the data processor (FIGS. 1: 1 to 3) including the CPU 1, includes plural assigners AS: AS1, AS2, . . . , ASi, . . . , ASn (symbol "AS" representatively denotes an assigner). The assignment controller AC accepts or obtains inputs of the "key depression note information Nk: Nk1, Nk2, . . . " or the "key depression note information Nki of the performance key area+additional note information Na: Na1, Na2, . . . " which are provided as information of notes to be assigned for tone generation from the key depression state detector 5 or the additional sound generator AN. Further, the assignment controller AC assigns a timbre for each assigner AS with respect to such key depression note information Nk or Nki+Na and outputs, as tone generation notes, sounding note information Nt: Nt1, Nt2, . . . , Nti, . . . , Ntn (symbol "Nt" representatively denotes sounding note information or a tone generation note), to which the respective timbres are assigned, to tone generation processing sequences TC: TC1, TC2, . . . , TCi, . . . , TCn corresponding to the assigner AS.

Describing more specifically, a timbre can be arbitrarily set to each assigner AS, and it is possible to set to each assigner AS "assignment criteria" according to a predetermined note determining rule ("assignment type"). The assignment criteria determines which note information among the note information Nk or Nki+Na to be assigned for tone generation should be sounded in the timbre set to the corresponding assigner AS (in other words, which note should be assigned to the timbre corresponding to the assigner AS) or the like based on the tone pitch of the note (note number) in each note information to be assigned for tone generation and the note-on timing order thereof. Therefore, when the note information Nk or Nki+Na to be assigned for tone generation are inputted to the assignment controller AC, each assigner AS determines which note information among the note information Nk or Nki+Na to be assigned for tone generation should be sounded in the timbre set to the assigner AS based on the respective settings thereof, and thereby a certain note among the notes to be assigned for tone generation is assigned to the timbre part set to the assigner AS. Then, the note information determined to be sounded by each assigner AS is supplied as the sounding note information Nt to the musical tone generator 107.

The musical tone generator 107 corresponds to the function of the tone generator circuit 7 (FIG. 1) and includes plural tone generation processing sequences TC1 to TCn, and the musical tone output unit SD corresponds to the functions of the DAC 14 and the sound system 15. Specifically, in the musical tone generating unit 7, the sounding note information Nt determined in each assigner AS in the assignment controller AC is supplied to the tone generation processing sequence TC corresponding to the assigner AS, each tone generation processing sequence TC generates an audio signal in the assigned timbre based on each piece of the sounding note information Nt, and the generated audio signal is sounded via the speaker of the musical tone output unit SD. Note that the tone generation sequence corresponding to the assigner AS is referred to as a "part". Further, each tone generation processing sequence TC is constituted of one or more tone generation channels to which the same timbre is set, and each assigner AS is configured to instruct the corresponding tone generation processing sequence TC to generate, in the timbre set to the assigner AS, sound of one or plural notes of sounding note information Nt which are determined to be sounded. Thus, the number of tone generation processing sequences TC does not necessarily match the number of assigners AS. However, in the illustrated example, for simplicity of description, the assigner AS, the part, and the tone generation processing sequence TC corresponds one by one and are of the same number "n".

As described above, this electronic musical instrument EM functions as the tone generation assigning apparatus, and while the harmony function is off, the key depression note information Nk are inputted as notes to be assigned for tone generation from the key depression state detector 5 to the assignment controller AC, and the assignment controller AC assigns note information complying with the assignment criteria of each assigner AS among the inputted key depression note information Nk to the part associated with the timbre set to this assigner AS to allow the note to sound in the timbre. On the other hand, while the harmony function is on, the additional sound generator AN determines a chord based on notes of the key depression note information Nkc of the chord key area (Kc), plural additional notes Na: Na1, Na2, . . . having pitches which harmonize the pitch of the note of the key depression note information Nki of the performance key area (Ki) are generated automatically according to the determined chord, "key depression note information Nki of the performance key area+additional note information Na" are inputted as notes to be assigned for tone generation to the assignment controller AC, and the assignment controller AC assigns plural parts (timbres) to the inputted "key depression note information Nki of the performance key area+additional note information Na" similarly to that while the harmony function is off, to thereby sound plural notes distributed among the timbres of the plural parts. That is, while the harmony function is on, tone generation assignment processing by the ensemble tone generating function is implemented on not only the key depression note information Nki based on the user's musical performance but also the additional note information Na generated automatically corresponding to the key depression note information Nki, and thus an effect as if an ensemble performance is performed can be obtained by a simple performance operation with a small number of key depressions.

[Display Example]

Figure 3:
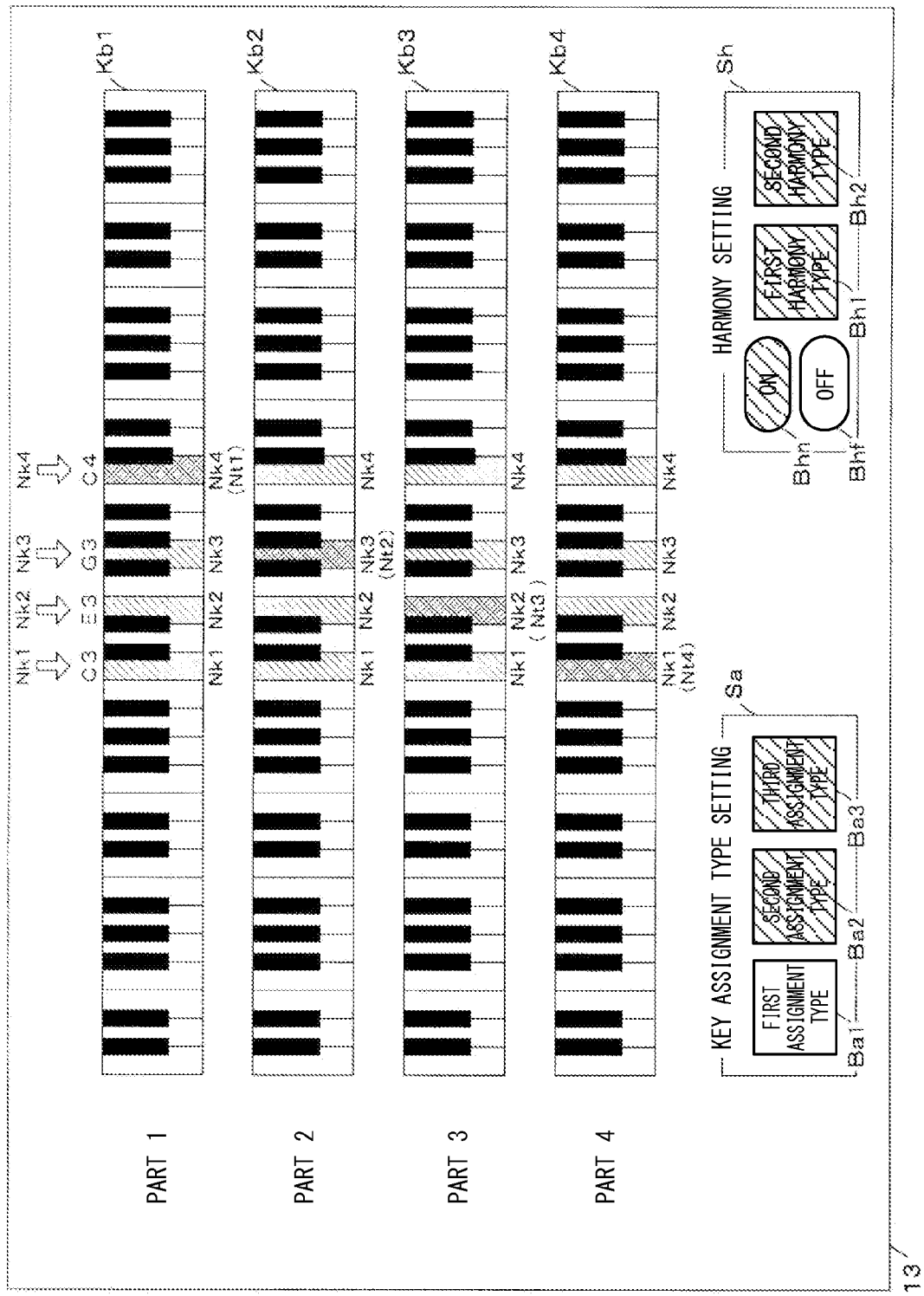
FIG. 3 illustrates a screen display example when a harmony function is off according to an embodiment of the invention.
Figure 4:
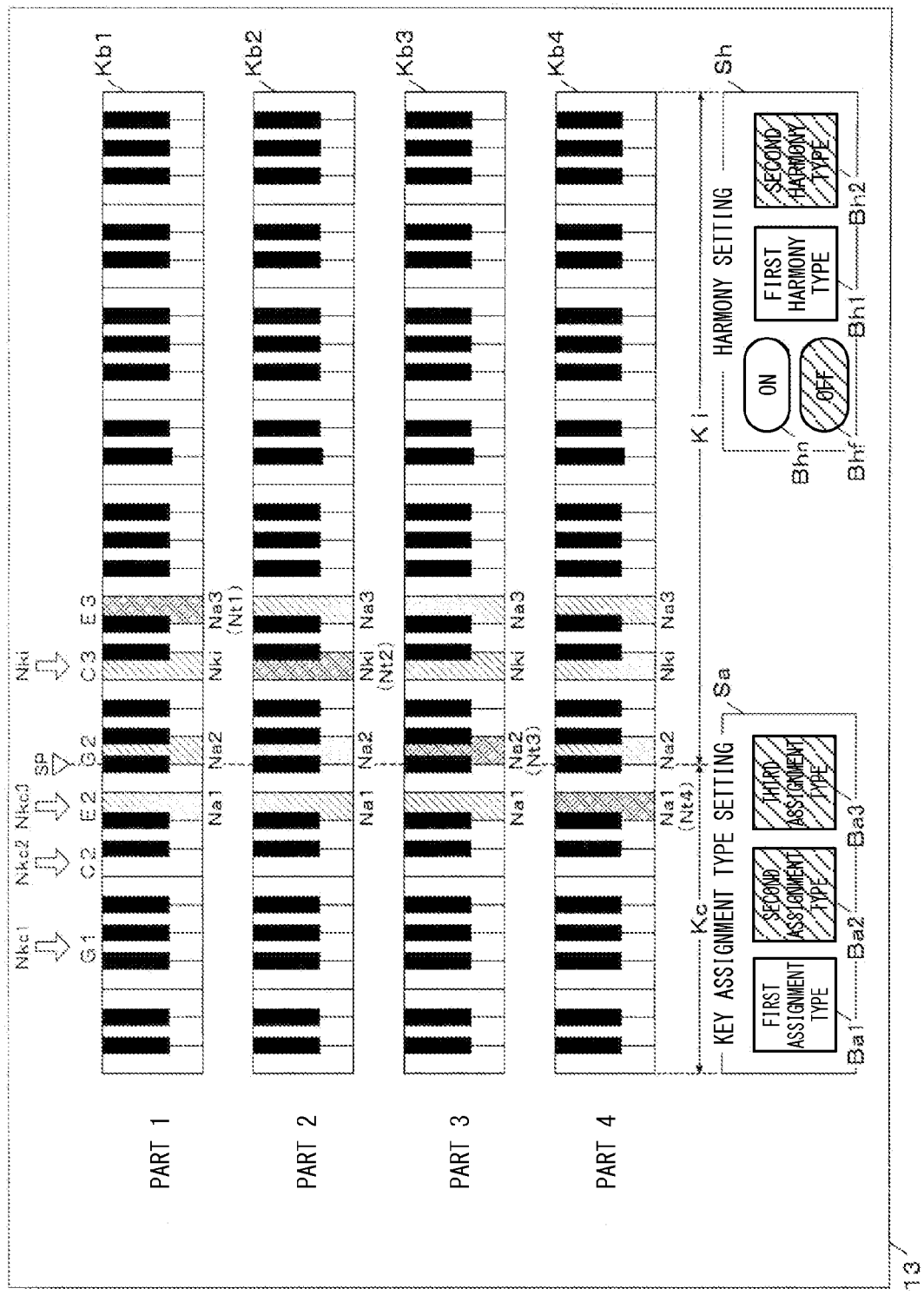
FIG. 4 illustrates a screen display example when a harmony function is on according to an embodiment of the invention.

This electronic musical instrument EM functions as a tone generation state displaying apparatus by a tone generation assignment display processing, displays tone generation state of each part on a screen corresponding to execution of the ensemble tone generating function which assigns plural parts to plural notes and generates sound of the notes, and, at this time, displays in different display styles a "note not to be sounded" and a "note to be sounded" (Nt) in each part with respect to notes for the assignment inputted for assignment control. FIG. 3 and FIG. 4 illustrate a display example for describing a tone generation state display function according to an embodiment of the invention. Note that in the following description, it is assumed that assigners AS, parts, and tone generation processing sequences TC correspond one to one and are of the same number (n=4), and for example, a musical instrument timbre: "trumpet" is set to a first assigner, a first part (PART 1), and a first sequence TC1; a musical instrument timbre: "trombone" to a second assigner, a second part (PART 2), and a second sequence TC2; a musical instrument timbre: "tenor sax" to a third assigner, a third part (PART 3), and a third sequence TC3; and a musical instrument timbre: "baritone sax" to a fourth assigner, a fourth part (PART 4), and a fourth sequence TC4.

In this electronic musical instrument EM, the tone generation state display screen as illustrated is displayed on the display 13 during the tone generation assignment display processing. On the tone generation state display screen, four keyboard images Kb1 to Kb4 (which are displayed only and cannot be operated) are displayed corresponding to four part name descriptions: "PART 1" to "PART 4", and a key assignment type setting area Sa and a harmony setting area Sh are provided on a left and right side below these keyboard images Kb1 to Kb4. In the key assignment type setting area Sa, three assignment type specifying buttons Ba1 to Ba3 are displayed operably, and in the harmony setting area Sh, a harmony function on button Bhn, a harmony function off button Bhf, and two harmony type specification buttons Bh1 and Bh2 are displayed operably. That is, the respective buttons Ba1 to Ba3, Bhn, Bhf, Bh1, and Bh2 are operable by operating the corresponding setting control (such as switch) 12 on the control panel, and when the setting control 12 and the display 13 are constituted of a touch panel, the respective buttons can be operated directly.

FIG. 3 illustrates the tone generation state display screen when the "harmony function" is set to off by operating the harmony function off button Bhf of the harmony setting area Sh [the button Bhf is displayed by highlighting (high-brightness display)] and the first assignment type "ASSIGNMENT TYPE 1" is specified by operating the first assignment type specifying button Ba1 of the key assignment type setting area Sa (button Ba1 is displayed by highlighting). Further, this tone generation state display screen depicts that keys: "C3, E3, G3 and C4" are currently depressed by the user as indicated by arrows right above display areas of the keyboard images Kb1 to Kb4. Specifically, the key depression note information Nk1 to Nk4: "C3, E3, G3 and C4" based on depressed keys in the entire key area of the keyboard (performance controls) 11 are all inputted as notes to be assigned for tone generation to the assignment controller AC.

In this case, according to the note determining rule defined by the first assignment type, among the notes of the key depression Nk1 to Nk4: "C3, E3, G3 and C4" inputted as notes to be assigned for tone generation, the note Nk4: "C4" is selected as a tone generation note Nt1 in the first part, the note Nk3: "G3" is selected as a tone generation note Nt2 in the second part, the note Nk2: "E3" is selected as a tone generation note Nt3 in the third part, the note Nk1: "C3" is selected as a tone generation note Nt4 in the fourth part. The selected tone generation notes Nt1 to Nt4 are sent to the tone generation processing sequences TC1 to TC4 of the musical tone generating unit 7 via the first to fourth assigners, and are sounded in the timbres (in this case, "trumpet", "trombone", "tenor sax" and "baritone sax") set to the respective assigners corresponding to each tone generation processing sequence.

According to this, the display unit (6, 13) emphatically displays, in the keyboard images Kb1 to Kb4, respective keys corresponding to the tone generation notes Nt1 to Nt4 in a predetermined display style (in orange for example) as indicated by a netted pattern. Further, the display unit (6, 13) emphatically displays, in the keyboard images Kb1 to Kb4, respective keys corresponding to notes of the key depression Nk which are not selected as the tone generation notes Nt in the respective first to fourth parts in a different display style (in gray for example) as illustrated by hatching.

As described above, when the "harmony function" is set to off, notes of the key depression Nk1 to Nk4 are all assumed as the notes to be assigned for tone generation, and in the respective first to fourth parts, the keys corresponding to the notes of the key depressions Nk1 to Nk4 are emphatically displayed (in a display style to be recognized as visually clearly different from other keys, for example, a color or pattern is added or brightness is changed). However, among these notes Nk1 to Nk4, the keys corresponding to notes not to be sounded in the respective first to fourth parts are displayed in a predetermined display style, namely, the first style (in grey for example), and the keys corresponding to the notes (Nt1 to Nt4) to be sounded in the respective first to fourth parts are displayed in another display style, namely, the second style (in orange for example).

FIG. 4 illustrates the tone generation state display screen in the case where the "harmony function" is set to on and the "first harmony type" is specified, by operating the harmony function on button Bhn and the first harmony type specifying button Bh1 of the harmony setting area Sh, and the first assignment type "ASSIGNMENT TYPE 1" is specified by operating the first assignment type specifying button Ba1 of the key assignment type setting area Sa [the buttons Bhn, Bh1 and Ba1 are displayed by highlighting (high-brightness display)]. Further, this tone generation state display screen represents that the keys: "G1, C2, E2 and C3" are currently depressed by the user as indicated by arrows. When the "harmony function" is set to on and the first harmony type is specified, a split function turns on and the key area is divided at a split point set in advance. In this screen, a split description: "SP", a reverse-triangle split mark, and a dashed line running below the split mark displays the split point, and the keys: "G1, C2 and E2" are on the left side of the split point, that is, in the chord key area Kc, and the key "C3" is on the right side of the split point, that is, in the performance key area Ki. Specifically, the note of the depressed key Nki: "C3" of the performance key area based on the depressed key in the performance key area Ki of the keyboard (performance controls) 11 and additional notes Na1 to Na3: "E2, G2 and E3" generated by the additional sound generator AN according to a chord determination based on the depressed key notes Nkc1 to Nkc3: "G1, C2 and E2" of the chord key area based on the depressed keys in the chord key area Kc are inputted as the notes to be assigned for tone generation to the assignment controller AC.

Here, the split function and the function of the additional sound generator AN while the harmony function is on will be described in more detail. When the split function is turned on, the key area of the keyboard 11 is divided into the performance key area Ki and the chord key area Kc at the split point set in advance. In the example of FIG. 4, the key area is divided left and right at the note: F#2 being the split point, where the note: F#2 and below is the chord key area Kc for chord key detection, and the note: G2 and above operates as the performance key area Ki for ensemble tone generation. Note that regarding turning on of the split key function, the split function may be turned on or off in conjunction with turning on or off of the harmony function, or the split function may be turning on or off by a user operation on a switch or the like (setting controls 12) on the control panel.

As indicated by arrows in the diagram, when the user depresses "G1, C2, E2 and C3" on the keyboard 11, the additional sound generator AN operates as follows:

(1) Among the notes of the depressed keys, the additional sound generator AN assumes the "C3" in the performance key area Ki for ensemble tone generation as a note to be assigned for tone generation.

(2) Among the notes of the depressed keys, the additional sound generator AN makes a chord determination based on "G1, C2 and E2" present in the chord key area Kc. The chord determination is performed using an existing technique (for example, ones described in JP S56(1981)-109398 A and U.S. Pat. No. 4,353,278), and in this case, for example, "C major" is determined as a chord.

(3) The additional sound generator AN additionally generates additional sound based on the chord determined in (2) according to predetermined rules, to the "C3" assumed as the note to be assigned for tone generation in (1).

An existing technique (for example, one described in JP H08(1996)-179771 A) is used for the rules for adding the additional sound. In the example of FIG. 4, the first harmony type of "HARMONY TYPE 1" and the second harmony type of "HARMONY TYPE 2" can be selected, and adding rules are different depending on the type. For example, for the currently selected first harmony type, three to five sounds (which differ depending on the chord) within one octave above and below the key depressed by the user are added.

By such note adding function, "E2, G2 and E3" are determined as the notes to be added, and "E2, G2, C3 and E3" combining these additional notes "E2, G2, E3" with "C3" assumed as the note to be assigned for tone generation in (1) are inputted to the assignment controller AC.

Note that in the first harmony type, harmony sound is added as described above based on the chord, but the second harmony type is a type which generates harmony sound not based on the chord, and for example, a note higher (or lower) by one octave or a note higher by five degrees is added to the input sound.

In the assignment controller AC, the note of the depressed key Nki: "C3" of the performance key area Ki inputted from the additional sound generator AN and the additional notes Na1 to Na3: "E2, G2, E3" are accepted and assumed as notes to be assigned for tone generation, and the notes Nt1 to Nt4 to be sounded in the respective first to fourth parts are determined according to the currently selected first assignment type. Then, the notes Nt1 to Nt4 to be sounded are displayed in orange for example, and the notes not to be sounded are displayed in gray for example, among the notes to be assigned for tone generation.

Specifically, according to the note determining rule defined by the first assignment type, among the note of the depressed key Nki: "C3" of the performance key area Ki and the additional notes Na1 to Na3: "E2, G2 and E3" which are inputted as the notes to be assigned for tone generation, the additional note Na3: "E3" is selected as the tone generation note Nt1 in the first part, the note of the depressed key Nki: "C3" of the performance key area Ki is selected as the tone generation note Nt2 in the second part, the additional note Na2: "G2" is selected as the tone generation note Nt3 in the third part, the additional note Na1: "E2" is selected as the tone generation note Nt4 in the fourth part. The selected tone generation notes Nt1 to Nt4 are sent to the tone generation processing sequences TC1 to TC4 of the musical tone generating unit 7 via the first to fourth assigners, and sounded in the timbres (in this case, "trumpet", "trombone", "tenor sax" and "baritone sax") set to the respective assigner corresponding to each tone generation processing sequences.

According to this, the display unit (6, 13) emphatically displays, in the keyboard images Kb1 to Kb4, respective keys corresponding to the tone generation notes Nt1 to Nt4 in a predetermined display style (in orange for example) as indicated by a netted pattern. Further, respective keys in the keyboard images Kb1 to Kb4 corresponding to the notes of the depressed key Nki in the performance key area Ki or the additional notes Na1 to Na3 not selected as the tone generation notes Nt in the respective first to fourth parts are emphatically displayed in a different display style (in gray for example) as illustrated by hatching.

As described above, when the "harmony function" is set to on, the note of the depressed key Nki of the performance key area Ki and the additional notes Na1 to Na3 are all assumed as the notes to be assigned for tone generation, and the keys corresponding to the notes Nki, Na1 to Na3 to be assigned for tone generation are emphatically displayed in the respective first to fourth parts. However, among these notes, the keys corresponding to the notes not to be sounded in the respective first to fourth parts are displayed in a predetermined display style, namely, the first style (in gray for example), and the keys corresponding to the notes (Nt1 to Nt4) to be sounded in the respective first to fourth parts are displayed in a different display style, namely, the second style (in orange for example).

Note that for convenience, "PART 1", "PART 2", . . . are used to describe part names in FIG. 3 and FIG. 4, but in practice, names of musical instrument timbres set to the part, such as "trumpet", "trombone", "tenor sax", "baritone sax", . . . and the like, predetermined musical instrument timbre symbols or the like may be used. Further, the symbols for describing notes in the figures: Nk1, Nk2, . . . ; Nkc1, Nkc2, . . . ; Nki; G1, C2, E2, G2, C3, E3, G3, C4; (Nt1), (Nt2), . . . ; (Na1), (Na2), . . . are not displayed on the screen. The arrows indicating depressed keys may be omitted or displayed by an arrow image or the like. Moreover, regarding the split point (position of note where the key area is divided) set when the split function is on, although the split point is displayed with the split description: "SP", the reverse-triangular split mark, and the dashed line vertically passing through the position above the keyboard images Kb1 to Kb4 corresponding to the split point in FIG. 3 and FIG. 4, the note at the split point may be displayed at a position set arbitrarily by a letter description, or one or more of these split point display methods may be employed. In some cases, the split position on this screen may be omitted, and the note of the split point may be displayed on a different text display device on the display panel.

[Other Display Styles]

In FIG. 3 and FIG. 4, those displaying the keyboard image on the tone generation state display screen and controlling the display styles of key images corresponding to the notes to be assigned for tone generation and the tone generation notes have been described, but the display of the keyboard images respectively corresponding to the parts on the tone generation state display screen is not essential. Any style can be employed as long as it can display note information, and for example, a staff notation, a note name description, or the like can be employed. FIG. 5A to FIG. 5C illustrate screen display examples according to other embodiments of the invention.

(1) Staff Notation Display

On the tone generation state display screen, musical notes representing the notes to be assigned for tone generation and the tone generation notes Nt may be displayed in a staff notation, and the display styles of the musical notes may be controlled. For example, as illustrated in FIG. 5A, a staff notation are displayed regarding each of the first to fourth parts, and the notes to be assigned for tone generation are displayed on each staff notation by a white musical note image Wh [inside the musical note is unpatterned (blank) for example] as a first style. However, the tone generation notes Nt1 to Nt4 of the respective first to fourth parts are displayed in the staff notation by a colored musical note image Co (netted pattern in the musical note representing an orange color for example) as a second style.

(2) Note Name Text Display

On the tone generation state display screen, texts describing the note names of the notes to be assigned for tone generation and the tone generation note Nt may be displayed, and a display style of these texts may be controlled. For example, as illustrated in FIG. 5B, regarding each of the first to fourth parts, text images describing note names of the notes to be assigned for tone generation are displayed by a normal font as a first style, but text images describing note names of the tone generation notes Nt1 to Nt4 are displayed with an underline Un as a second style. This embodiment is applicable also to the case where a display having a low display performance is used as the display 13.

(3) Common Keyboard Display

On the tone generation state display screen, a common keyboard may be displayed for the respective parts instead of displaying a keyboard in every part, and simplified display of the notes to be assigned for tone generation and tone generation notes Nt may be performed for each part. For example, as illustrated in FIG. 5C, displayed are a keyboard image Kbc common to the respective first to fourth parts and part lines L1 to L4 extending in an arrangement direction of the keyboard image Kbc (lateral direction of the screen) corresponding to the respective part name descriptions ("PART 1" to "PART 4") arranged in a vertical direction of the screen. Then, on the common keyboard image Kbc, the key images corresponding to the notes Nt1 to Nt4 to be assigned for tone generation are emphatically displayed [netted patterns of the key images representing an orange color for example]. On the respective part lines L1 to L4, circle marks (○ symbols) Mkb are displayed at positions corresponding to the notes to be assigned for tone generation, whereas star marks (★ marks) Mka of larger size are displayed at positions corresponding to the tone generation notes Nt1 to Nt4 of the corresponding first to fourth parts. That is, the notes to be assigned for tone generation for the respective first to fourth parts are displayed in a first style by the "circle marks (○ symbol) Mkb+emphatic display of key images", and the tone generation notes Nt1 to Nt4 of the respective first to fourth parts are displayed in a second style by the "star marks (★ symbol) Mka+emphatic display of key images".

Here, the display of the circle marks (○ symbols) Mkb may be omitted. In this case, the inputted notes to be assigned for tone generation are displayed in a first style by emphatic display (in orange for example) of the keyboard image Kbc (keys corresponding to Nt1 to Nt4), and the tone generation notes Nt1 to Nt4 of the respective first to fourth parts are displayed in a second style by the star marks (★ symbols) placed at the positions corresponding to the emphatic-displayed key images. Specifically, pitches of the accepted plural input notes to be assigned for tone generation are displayed in the first style (key image in orange for example), and pitches of the notes Nt selected to be sounded in each of the plural parts are displayed in the second style (star marks of the respective parts at the positions corresponding to the orange key images for example) corresponding to the respective parts, thereby making it easier to recognize that which note among the inputted notes is selected to be sounded in each part.

As described above, this electronic musical instrument EM functions as a tone generation assignment displaying apparatus, and in the assignment controller AC, inputs of plural notes (Nk1 to Nk4 in FIG. 3, Nki and Na1 to Na3 in FIG. 4) to be assigned for tone generation are accepted, and notes Nt to be sounded in each of the first to fourth parts are selected from the plural notes to be assigned for tone generation according to the predetermined note determining rule called "assignment type". On the other hand, the display unit (6, 13) displays the tone generation states in the first to fourth parts on the screen, in which the display styles regarding the respective first to fourth parts of the notes Nt selected to be sounded are differentiated from the display styles of any other notes of the accepted input notes or all the notes. Specifically, regarding the respective first to fourth parts, among the accepted plural input notes (Nk1 to Nk4 in FIG. 3, Nki and Na1 to Na3 in FIG. 4) to be assigned for tone generation, notes not to be sounded in the respective first to fourth parts are displayed in a predetermined display style [gray key image (hatching in FIG. 3 and FIG. 4) for example], and the notes Nt selected to be sounded in the respective first to fourth parts are displayed in a different display style [orange key images (netted pattern in FIG. 3 and FIG. 4) for example]. Or, the accepted plural input notes to be assigned for tone generation are displayed in a predetermined display style [for example, orange key images (netted patterns) in the case where a circle mark is not displayed in FIG. 5C], and the notes Nt selected to be sounded in each of the first to fourth parts are displayed in a different display style corresponding to the first to fourth parts [for example, star marks placed at positions corresponding to the orange key images (netted patterns) in the case where a circle mark is not displayed in FIG. 5C].

Thus, when plural input notes are distributed among plural parts to be sounded, through a configuration such that an input note (tone pitch) not to be sounded and an input note (tone pitch) Nt to be sounded are in different display modes in each part, or all the notes (tone pitches) inputted and an input note (tone pitch) Nt to be sounded in each part are in different display modes, tone generation states of the respective parts can be visually confirmed easily as to what notes are accepted as an assignment target and which one is sounded among the accepted notes.

[Various Assignment Types]

In this electronic musical instrument EM, the assignment rules called "assignment types" are stored in the storage device 4 in a table format, and when plural parts are assigned to plural input notes by the tone generation assigning function, an assignment type selected arbitrarily by the user operation can be applied. FIG. 6A to FIG. 6C illustrate examples of assignment types according to an embodiment of the invention. These examples are suitable for the case where a timbre is set to each of the first to fourth parts corresponding to respective assigners AS1 to AS4.

(1) First Assignment Type

On the table of the first assignment type, as illustrated in FIG. 6A, an assignment criteria is set to each of the first to fourth parts corresponding to respective first to fourth assigners AS1 to AS4, the assignment criteria being defined as "target note", "priority method", and "number to be sounded". The "target note" defines a pitch condition of a note to be allowed to assign to the assigner AS. According to the definition of the "target note", one or more notes to which a part corresponding to the assigner AS is potentially assignable are selected from among all the notes to be assigned for tone generation. The pitch condition defined by the "target note" is, for example, "to extract all the notes (from all the notes to be assigned for tone generation)", "to exclude a note having the highest pitch (from all the notes to be assigned for tone generation)", "to extract up to two notes from a lower pitch side [to extract a note having the first lowest pitch and, if any, a note having the second lowest pitch from all the notes to be assigned for tone generation]", or so on.

The "priority method" defines the order of priority for determining a note (tone pitch) Nt to be actually sounded from the one or more notes selected according to the "target notes" defining a pitch condition of a note which is allowable to assign in the part. The "number to be sounded" defines the number of notes which can be sounded simultaneously via the assigner AS. Therefore, in the respective first to fourth parts, a predetermined number of tone generation notes (tone pitches) Nt defined by the "number to be sounded" is selected according to the definition of the "priority order". For example, when the "priority method" is set to the "higher-pitch-prior-to-lower-pitch", notes of the "number to be sounded" are selected from the highest note side of the notes selected according to the "target notes". When it is set to the "lower-pitch-prior-to-higher-pitch", notes of the "number to be sounded" are selected from the lowest note side of the notes selected according to "target notes". Further, when it is set to "last-note-prior-to-first-note", notes of the "number to be sounded" are selected from notes whose note-on timings are later from among the notes selected according to the "target notes". When it is "first-note-prior-to-last-note", notes of the "number to be sounded" are selected from notes whose note-on timings are earlier from among the notes selected according to the "target notes".

(2) Second Assignment Type

On the table of the second assignment type, as illustrated in FIG. 6B, an assignment criteria is set to each of the first to fourth parts corresponding to respective assigners AS1 to AS4, the assignment criteria being defined as "first target note", "second target note", "priority method", and "number to be sounded". The first assignment type and the second assignment type only differ in that, for extracting the tone generation note Nt in each part meeting a pitch condition from the notes to be assigned for tone generation, the first assignment type applies a filter of one stage, that is, "target note", whereas the second assignment type applies a filter of two stages, that is, "first target note" and "second target note". For example, a pitch condition of the "first target note" is, for example, "to extract all the notes (from all the notes to be assigned for tone generation)", "to exclude a note having the highest pitch (from all the notes to be assigned for tone generation)", "to exclude a note having the lowest pitch (from all the notes to be assigned for tone generation)", or so on. Further, a pitch condition of the "second target note" is, for example, "to extract up to two notes from a higher pitch side (extract a note having the first highest pitch and, if any, a note having the second highest pitch from all the notes to be assigned for tone generation)", "to extract up to two notes from a lower pitch side (extract a note having the first lowest pitch and, if any, a note having the second lowest pitch from all the notes to be assigned for tone generation)", or so on and may also be the case of no setting ("-").

When the first to fourth parts are assigned by applying the first or second assignment types, a note to be sounded in the respective parts is determined by the following procedure:

(a) Extraction processing: by applying a filter with a tone pitch according to a pitch condition defined by the "target note" or the "first target note" and the "second target note" of the respective first to fourth parts, notes corresponding to a specific pitch order are extracted or deleted from the notes to be assigned for tone generation, with regard to each of the first to fourth parts.

(b) With respect to the group of notes extracted in (a), according to the definition of the "priority method", that is, either the "higher-pitch-prior-to-lower-pitch" or "lower-pitch-prior-to-higher-pitch" based on the pitch order, or the "last-note-prior-to-first-note" or "first-note-prior-to-last-note" based on the note-on timing order, notes of the number indicated by the "number to be sounded" are selected, thereby the tone generation notes Nt1 to Nt4 to be sounded in each part are determined.

In the first and second assignment types, when the "number to be sounded" is 1 as in FIGS. 6 (1) and (2), all the first to fourth parts become "monophonic tone generation" to always generate only one or less sound, but there may be a part which performs "polyphonic tone generation" capable of generating two or more sounds, and a part to which the "number to be sounded" being two or more is set is a polyphonic tone generation part.

(3) Third Assignment Type

On the table of the third assignment type, as illustrated in FIG. 6C, an assignment criteria is set to each of the first to fourth parts corresponding to respective assigners AS1 to AS4, the assignment criteria being defined as notes to be selected with respect to the number of notes to be assigned for tone generation indicated by one to four of the "number of notes". When the third assignment type is applied to assign the first to fourth parts, note to be sounded in each part in determined in the following procedure:

(a) When the notes to be assigned for tone generation are determined, the number of the notes is confirmed, and the confirmed number is determined as the "number of notes".

(b) Which note in the respective first to fourth parts should be sounded are determined based on the assignment criteria, which is related to the pitch order in the respective first to fourth parts, corresponding to "number of notes" determined in (a) among the assignment criterion corresponding to one note to four notes in the table of FIG. 6C.

Note that although only the case of from one note to four notes is defined in the table of FIG. 6C, a definition may be given for the case where there are five or more notes to be assigned for tone generation. Alternatively, when the number of notes to be assigned for tone generation exceeds four, the table of FIG. 6C may be applied after selecting four notes based on a predetermined priority method (for example, last-note-prior-to-first-note).

[Operation Example of the Tone Generation Assignment Display Processing]

Figure 7:
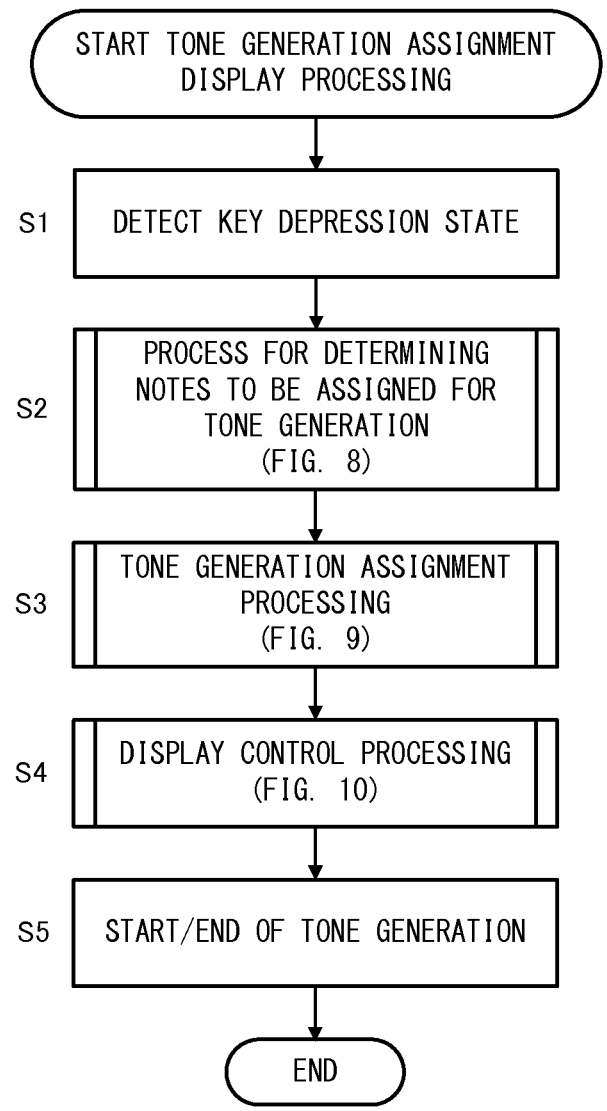
FIG. 7 is a flowchart illustrating an overall operation of the tone generation assignment display processing according to an embodiment of the invention.
Figure 8:
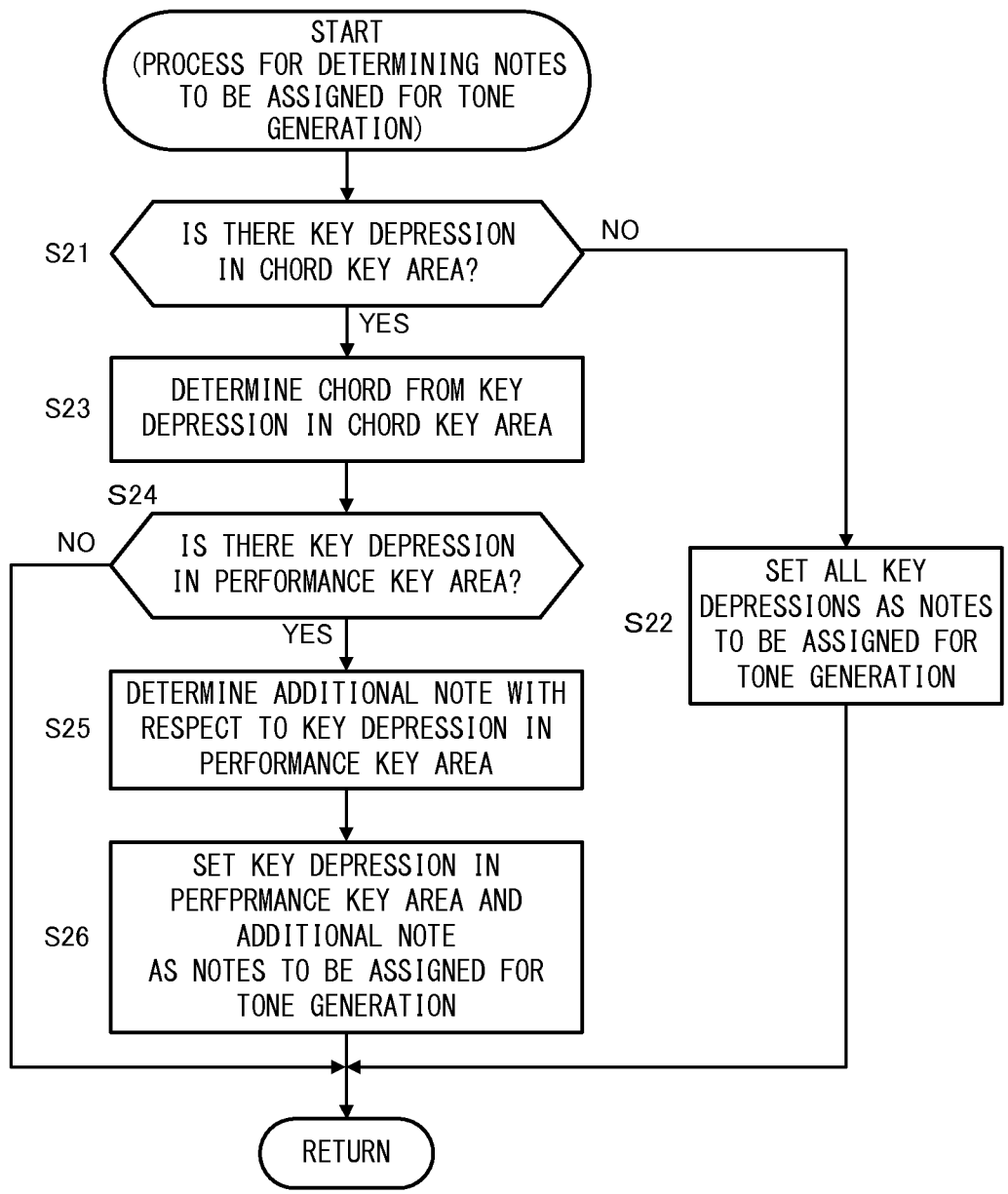
FIG. 8 is a flowchart illustrating a process for determining a note to be assigned for tone generation according to an embodiment of this invention.
Figure 9:
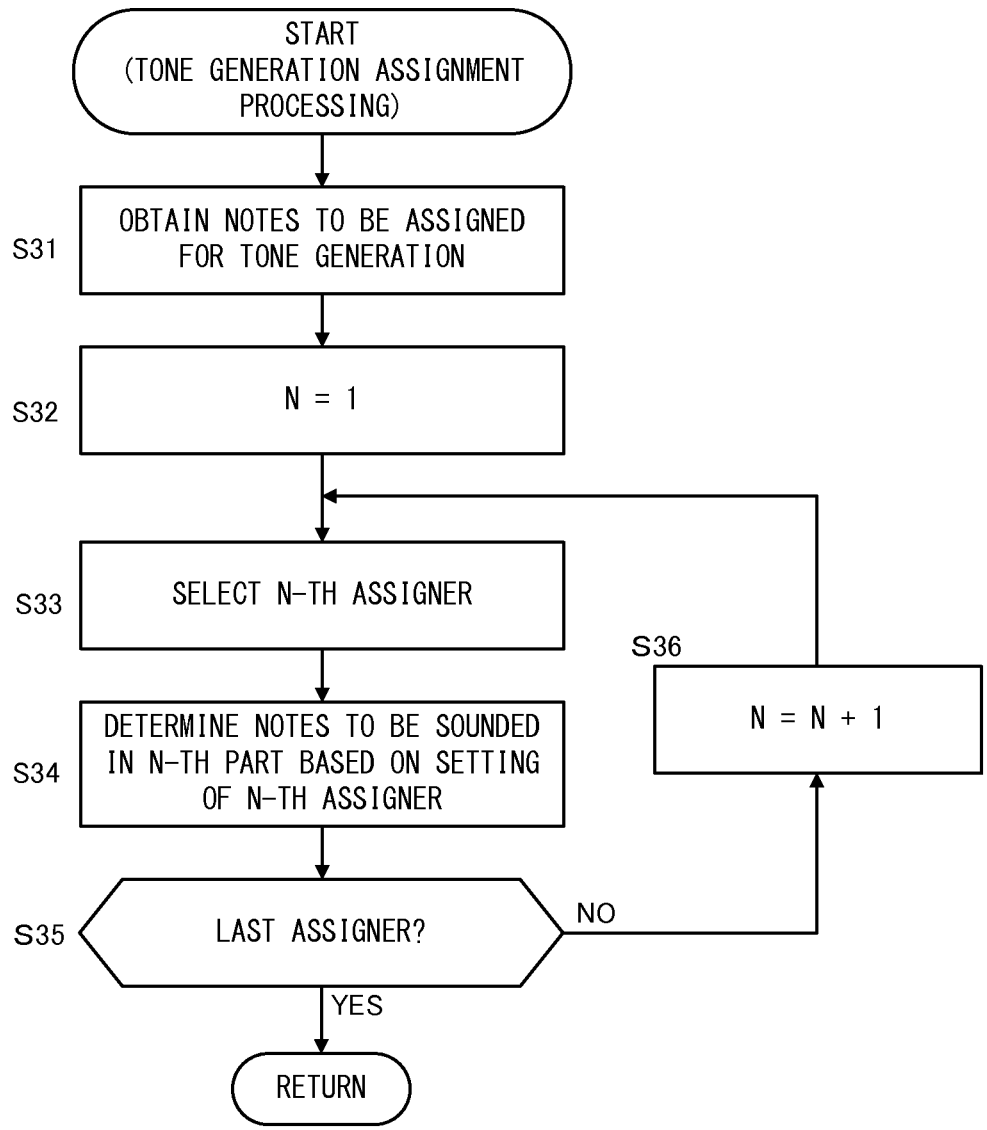
FIG. 9 is a flowchart illustrating a tone generation assignment processing according to an embodiment of the invention.
Figure 10:
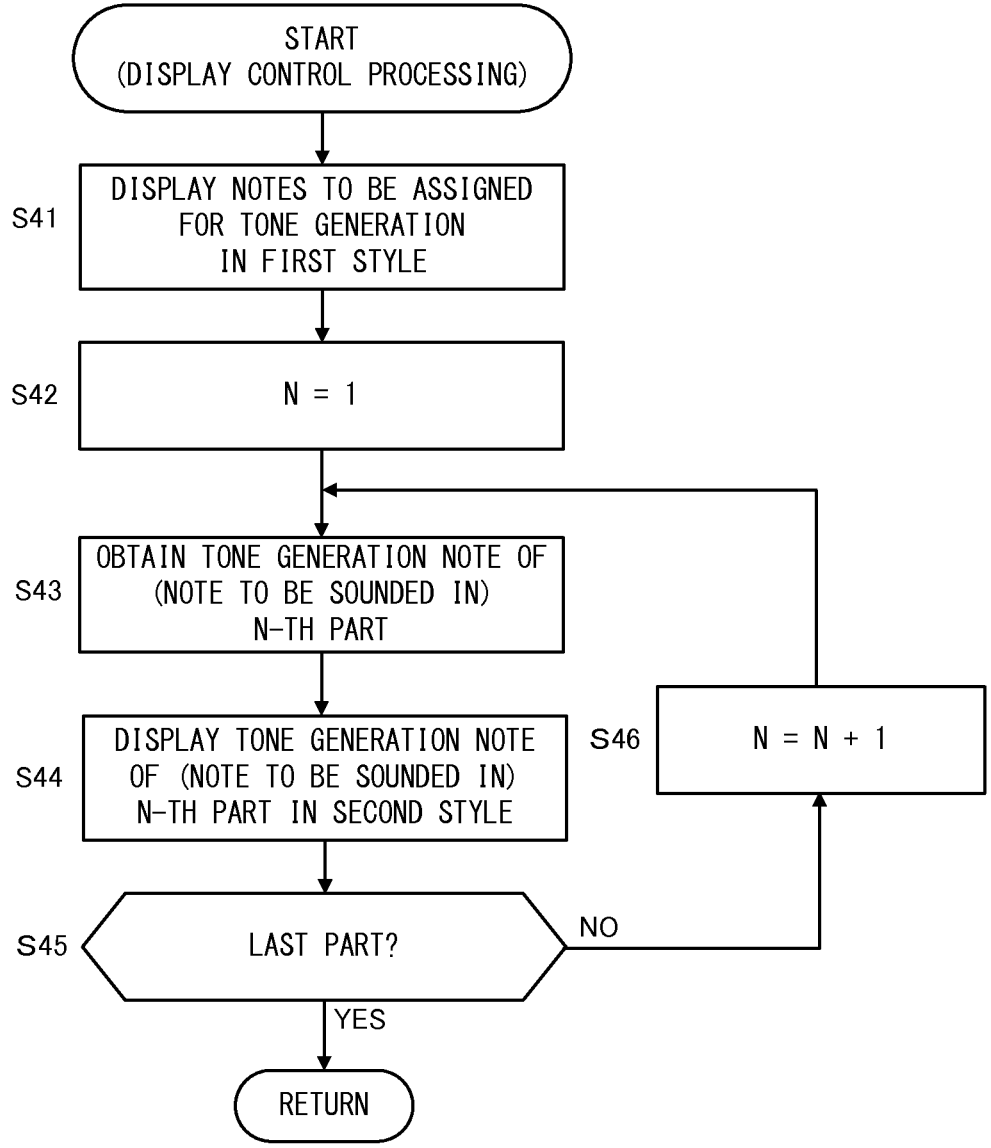
FIG. 10 is a flowchart illustrating a display control processing according to an embodiment of the invention.

FIG. 7 to FIG. 10 are flowcharts illustrating an operation of the tone generation assignment display processing according to an embodiment of the invention. A flowchart of FIG. 7 illustrates an overall and basic operation of the tone generation assignment display processing, and flowcharts of FIG. 8 to FIG. 10 illustrate specific operations of a process for determining a note to be assigned for tone generation, a tone generation assignment processing, and a display control processing, respectively, in the tone generation assignment display processing of FIG. 7.

The tone generation assignment display processing of FIG. 7 starts when a key depression state on the keyboard 11 changes. When the tone generation assignment display processing starts, the CPU 1 of the electronic musical instrument EM firstly detects in step S1 a change in key depression state on the keyboard 11, and executes in subsequent step S2 the process for determining a note to be assigned for tone generation illustrated in FIG. 8 to determine notes to be assigned for tone generation. Next, the CPU 1 proceeds to step S3 to execute the tone generation assignment processing illustrated in FIG. 9, determines the tone generation note Nt to be sounded in the respective parts, further executes the display control processing illustrated in FIG. 10 in step S4 to display tone generation states of the respective parts on the display 13 according to a result of the tone generation assignment processing, and proceeds to step S5. In step S5, the CPU 1 instructs the musical tone generating unit 7 to generate an audio signal based on the tone generation notes Nt determined in the tone generation assignment processing, and perform tone generation through the musical tone output unit SD. Further, when a note off with respect to the note of the depressed key corresponding to the tone generation note Nt is detected in step S1, the CPU 1 starts release of tone generation of the note to end the tone generation. Then, when a processing regarding the start and the end of the tone generation of step S5 is finished, the CPU 1 ends the tone generation assignment display processing at this time and waits for a next change of the key depression state.

<Process for Determining Notes to be Assigned for Tone Generation>

Once the process for determining notes to be assigned for tone generation of FIG. 8 starts, the CPU 1 of the electronic musical instrument EM firstly judges in step S21 whether or not the change in the key depression state detected in step S1 indicates a key depression in the chord key area Kc. Here, when it is judged that there is no key depression in the chord key area Kc (that is, chord key division is not performed or a key depression is performed only in the performance key area Ki) (S21=NO), the CPU 1 proceeds to step S22, sets all the currently depressed notes Nk (for example, Nk1 to Nk4 on the uppermost part of FIG. 3) as the notes to be assigned for tone generation, ends the process for determining a note to be assigned for tone generation of this time, and returns to step S3 of the tone generation assignment display processing (FIG. 7) [=proceeds to step S31 of the tone generation assignment processing (FIG. 9)].

On the one hand, when it is judged in step S21 that there is a key depression in the chord key area Kc (and key area division is performed) (S21=YES), the CPU 1 proceeds to step S23 to determine a chord from the note of the depressed key Nkc of the chord key area Kc (for example, Nkc1 to Nkc3 of the uppermost part of FIG. 4) and proceeds to step S24. In step S24, the CPU 1 judges whether there is a key depression or not in the performance key area Ki in the key depression state detected in step S1, and when it is judged that there is no key depression in the performance key area Ki (S24=NO), the CPU 1 returns to step S3 of the tone generation assignment display processing (FIG. 7).

On the other hand, when it is judged in step S24 that there is a key depression in the performance key area Ki (S24=YES), the CPU 1 proceeds to step S25 to determine the additional note Na (for example, Na1 to Na3 of FIG. 4) indicative of the determined chord with respect to the note Nki of the depressed key of the performance key area Ki and proceeds to step S26. In step S26, the CPU 1 sets the note Nki of the depressed key of the performance key area Ki and the additional note Na as the notes to be assigned for tone generation, and returns to step S3 of the tone generation assignment display processing (FIG. 7).

<Tone Generation Assignment Processing>

Once the tone generation assignment processing of FIG. 9 starts, the CPU 1 of the electronic musical instrument EM firstly obtains (accepts) in step S31 the notes to be assigned for tone generation set in steps S22 or S26, sets in step S32 "1" (N=1) to the assigner number N (N=1 to n in FIG. 2, and N=1 to 4 in FIG. 3 and so on. N is also a part number), and proceeds to step S33.

In step S33, the CPU 1 selects the N-th assigner, and in step S34, the CPU 1 determines (selects) the tone generation note Nt to be sounded in the corresponding part N based on the setting of the N-th assigner, proceeds to step S35, and judges whether or not the current assigner number N indicates the last assigner or not. Here, when the current assigner number N has not reached the number of the last assigner ("n" in FIG. 2 or "4" in FIG. 3 and so on) (S35=NO), the CPU 1 increments in step S36 the currently set assigner number N by 1 (N=N+1) and returns to step S33.

Then, while the assigner number N has not reached the number of the last assigner (S35=NO), the processing of steps S33 to S36 is repeated, and when the assigner number N reach the number of the last assigner (S35=YES), the CPU 1 ends the tone generation assignment processing of this time, and returns to step S4 of the tone generation assignment display processing (FIG. 7) [=proceeds to step S41 of the display control processing (FIG. 10)]. That is, by the tone generation assignment processing of FIG. 9, the tone generation note Nt of each part is determined, and when the tone generation notes Nt of all the parts are determined, the CPU 1 proceeds to next processing.

<Display Control Processing>

Once the display control processing of FIG. 10 starts, the CPU 1 of the electronic musical instrument EM firstly controls the display unit (6, 13) in step S41 to display the notes to be assigned for tone generation in the first style on the tone generation state display screen displayed on the display 13. Next, in step S42, the CPU 1 sets "1" (N=1) to the part number N (N=1 to n in FIG. 2, and N=1 to 4 in FIG. 3 and so on. N is also an assigner number), and proceeds to step S43.

In step S43, the CPU 1 obtains the tone generation note Nt of the N-th part, and in step S44, the CPU 1 controls the display unit (6, 13) to display the tone generation note Nt in the second style on the tone generation state display screen displayed on the display 13. In this case, when the input note to be sounded (which is the tone generation note Nt) and the input notes not to be sounded are in different display styles in each part, the tone generation note Nt of the part N are changed from the first style to the second style among the notes to be assigned for tone generation and displayed in step S41 in the first style. For example, when the display styles of FIG. 3 and FIG. 4 are employed, in step S41, the key images corresponding to the notes to be assigned for tone generation are displayed in gray (first style), and in step S44, the displayed color of the key image corresponding to the tone generation note Nt is switched (overwritten) from gray to orange (second style).

Next, the CPU 1 judges whether the current part number N indicates the last part or not, and when it has not reached the number of the last part ("n" in FIG. 2, "4" in FIG. 3 and so on) (S45=NO), the CPU increments in step S46 the currently set part number N by 1 (N=N+1) and returns to step S43. Then, while the part number N has not reached the number of the last part (S45=NO), the processing of steps S43 to S46 is repeated, and when reaches the number of the last part (S45=YES), the CPU 1 ends the display control processing of this time and returns to step S5 of the tone generation assignment display processing (FIG. 7).

Note that in the example of the display control processing in FIG. 10, for example, when the input note to be sounded and the input notes not to be sounded are in different display styles in each part as illustrated in FIG. 3 and FIG. 4, the processing to overwrite the first style of the tone generation notes Nt in each part to the second style is performed (S44) after the processing to display the notes to be assigned for tone generation in the first style is performed (S41). However, the order of processings is not limited to this. It may be configured so that after the processing to distinguish the notes to be assigned for tone generation as "notes not to be sounded" and "notes to be sounded" in each part is performed, the notes not to be sounded are displayed in the first style and the notes (Nt) to be sounded is displayed in the second style.

Various Embodiments

In the foregoing, embodiments of the tone generation state display system related to the invention have been described with reference to the drawings, but this invention is not limited to the structures or configuration of these embodiments, and various changes can be made. For example, for acceptance of note-on by performance operation by the user, any form of performance control, such as a stringed instrument, a pad, or a flat control, may be used instead of the keyboard.

Regarding the tone generation instruction, it may be accepted via the communication I/F 8 from an external device, or a note reproduced by an automatic performance apparatus may be accepted.

Further, the automatically generated plural additional notes are not limited to those for the harmony sounds added according to the note of a depressed key of the chord key area as in the embodiment. For example, it can be adapted to the case where some plural notes played on the keyboard are converted into appropriate notes according to the chord, or the case where a chord phrase is generated automatically when one note is played.

REFERENCE SIGNS LIST

EM electronic musical instrument (tone generation assigning apparatus, tone generation state displaying apparatus),
13 display or its screen,
AN additional sound generator
AC assignment controller
AS: AS1, AS2, . . . , ASi, . . . , ASn assigner
SD musical tone output unit (DAC and sound system)
TC1 to TCn tone generation processing sequences (tone generation sequence) corresponding to first to n-th parts
Nk: Nk1, Nk2, . . . note of depressed key or key depression note information
Nki note of depressed key of performance key area or key depression note information of performance key area
Nkc note of depressed key of chord key area or key depression note information of chord key area
Na: Na1, Na2, . . . additional note or additional note information
Nt: Nt1, Nt2, . . . tone generation note or sounding note information
Kb1 to Kb4, Kbc part keyboard image and common keyboard image
Sa assignment type setting area
Ba1 to Ba3 assignment type specifying button
Sh harmony setting area
Bhn, Bhf harmony function on button and harmony function off button
Bh1, Bh2 harmony type specification button
SP, Ki, Kc split description, performance key area, and chord key area,
Un underline
L1 to L4 part line
Mka, Mkb star mark (★ symbol) and circle mark (○ symbol).

The invention claimed is:

1. A non-transitory machine-readable storage medium containing program instructions executable by a computer and enabling the computer to perform a method comprising:
accepting, as inputs, plural notes to be assigned for tone generation;
selecting, for each of predetermined plural timbres, one or more notes to be sounded in the timbre according to a predetermined note determining rule corresponding to the timbre from the accepted plural notes to be assigned for tone generation; and
displaying multiple instances of the accepted plural notes, each instance corresponding to a respective timbre of the plural timbres, such that,
for each timbre-corresponding instance of the accepted plural notes:
all the accepted plural notes are displayed as notes to be assigned for tone generation,
one or more notes not selected to be sounded in the timbre are displayed in one style, and
one or more notes selected to be sounded in the timbre are displayed in another style different from the one style.

2. The storage medium according to claim 1, wherein the accepted plural notes to be assigned for tone generation are specified by a performance operation of a user.

3. The storage medium according to claim 1, wherein the method further comprises generating plural notes automatically based on a note specified by a performance operation of a user, and
the generated plural notes are included among the accepted notes to be assigned for tone generation.

4. The storage medium according to claim 3, wherein the method further comprises obtaining chord information, and
the generated plural notes are generated automatically based on the note specified by the performance operation of the user and the obtained chord information.

5. The storage medium according to claim 1, wherein
each note determining rule corresponding to each timbre defines a rule for selecting, for the timbre, one or more notes from the plural notes to be assigned for tone generation based on tone pitch order or note-on timing order of the plural notes.

6. The storage medium according to claim 1, wherein
each note determining rule corresponding to each timbre defines a rule for selecting, for the timbre, one or more notes from the plural notes to be assigned for tone generation based on number and tone pitch order of the plural notes.

7. The storage medium according to claim 1, wherein
the method further comprises:
controlling a sound generator to generate, with respect to each timbre of the plural timbres, sound of the selected one or more notes in the timbre.

8. The storage medium according to claim 1, wherein
the displayed plural notes to be assigned for tone generation are displayed as positions of keys in images of keyboards corresponding respectively to the plural timbres, and
in the image of each keyboard,
keys of the one or more notes not selected to be sounded in the timbre corresponding to the image of the keyboard are displayed in the one style, and
keys of the one or more notes selected to be sounded in the timbre are displayed in the another style.

9. The storage medium according to claim 1, wherein
the displayed plural notes to be assigned for tone generation are displayed as positions of musical notes in images of staff notations corresponding respectively to the plural timbres, and
in the image of each staff notation,
musical notes at pitches of the one or more notes not selected to be sounded in the timbre corresponding to the image of the keyboard are displayed in the one style, and
musical notes at pitches of the one or more notes selected to be sounded in the timbre are displayed in the another style.

10. The storage medium according to claim 1, wherein
the displayed plural notes to be assigned for tone generation are displayed as lists of note names corresponding respectively to the plural timbres, and
in each of the lists,
note names of the one or more notes not selected to be sounded in the timbre corresponding to the list are displayed in the one style, and
note names of the one or more notes selected to be sounded in the timbre are displayed in the another style.

11. A non-transitory machine-readable storage medium containing program instructions executable by a computer and enabling the computer to perform a method comprising:
accepting, as inputs, plural notes to be assigned for tone generation;
selecting, for each of predetermined plural timbres, one or more notes to be sounded in the timbre according to a predetermined note determining rule corresponding to the timbre from the accepted plural notes to be assigned for tone generation; and
displaying a first instance of each of the accepted plural notes in one style, all the accepted plural notes displayed as notes to be assigned for tone generation; and
displaying a second instance of each of the accepted plural notes such that, for each of the plural timbres, the selected one or more notes to be sounded in the timbre is displayed in another style different from the one style.

12. The storage medium according to claim 11, wherein
the accepted plural notes to be assigned for tone generation are specified by a performance operation of a user.

13. The storage medium according to claim 11, wherein
the method further comprises generating plural notes automatically based on a note specified by a performance operation of a user, and
the generated plural notes are included among the accepted notes to be assigned for tone generation.

14. The storage medium according to claim 13, wherein
the method further comprises obtaining chord information, and
the generated plural notes are generated automatically based on the note specified by the performance operation of the user and the obtained chord information.

15. The storage medium according to claim 11, wherein
each note determining rule corresponding to each timbre defines a rule for selecting, for the timbre, one or more notes from the plural notes to be assigned for tone generation based on tone pitch order or note-on timing order of the plural notes.

16. The storage medium according to claim 11, wherein
each note determining rule corresponding to each timbre defines a rule for selecting, for the timbre, one or more notes from the plural notes to be assigned for tone generation based on number and tone pitch order of the plural notes.

17. The storage medium according to claim 11, wherein
the method further comprising:
controlling a sound generator to generate, with respect to each timbre of the plural timbres, sound of the selected one or more notes in the timbre.

18. The storage medium according to claim 11, wherein
the displayed plural notes to be assigned for tone generation are displayed as positions of keys in an image of one keyboard, and, for each of the plural timbres, each of the selected one or more notes to be sounded in the timbre is displayed by a mark at a position corresponding to a key of the selected note in the image of the keyboard.

19. A tone generation state displaying apparatus, comprising:
a processor configured to:
accept, as inputs, plural notes to be assigned for tone generation;
select, for each of predetermined plural timbres, one or more notes to be sounded in the timbre according to a predetermined note determining rule corresponding to the timbre from the accepted plural notes to be assigned for tone generation; and
control a display unit to display multiple instances of the plural notes, each instance corresponding to a respective timbre of the plural timbres, such that,
for each timbre-corresponding instance of the plural notes:
all the plural notes are displayed as notes to be assigned for tone generation,
non-selected one or more notes for the timbre are displayed in one style by the display unit, and
the selected one or more notes for the timbre are displayed in another style different from the one style by the display unit.

20. A tone generation state displaying apparatus, comprising:
a processor configured to:
accept, as inputs, plural notes to be assigned for tone generation;
select, for each of predetermined plural timbres, one or more notes to be sounded in the timbre according to a predetermined note determining rule corresponding to the timbre from the accepted plural notes to be assigned for tone generation; and
control a display unit to
display a first instance of each of the plural notes in one style, all the plural notes displayed as notes to be assigned for tone generation; and
display a second instance of each of the accepted plural notes such that, for each of the plural timbres, the selected one or more notes to be sounded in the timbre is displayed in another style different from the one style.

* * * * *